US011442970B2

(12) United States Patent
Shibuya et al.

(10) Patent No.: US 11,442,970 B2
(45) Date of Patent: Sep. 13, 2022

(54) FACILITY SEARCH SYSTEM, FACILITY SEARCH METHOD, AND PROGRAM FOR ADDING AREA INFORMATION OF A FACILITY BY USING A PLACE TAG OF ANOTHER FACILITY CLOSE TO THE FACILITY

(71) Applicant: Rakuten Group, Inc., Tokyo (JP)

(72) Inventors: Kai Shibuya, Tokyo (JP); Takayuki Kurosawa, Tokyo (JP); Mitsuru Saito, Tokyo (JP); Mariko Ogura, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 0 days.

(21) Appl. No.: 16/964,652

(22) PCT Filed: May 21, 2018

(86) PCT No.: PCT/JP2018/019462
§ 371 (c)(1),
(2) Date: Jul. 24, 2020

(87) PCT Pub. No.: WO2019/224867
PCT Pub. Date: Nov. 28, 2019

(65) Prior Publication Data
US 2021/0073248 A1    Mar. 11, 2021

(51) Int. Cl.
*G06F 16/29* (2019.01)
*G06F 16/2457* (2019.01)

(52) U.S. Cl.
CPC .......... *G06F 16/29* (2019.01); *G06F 16/2457* (2019.01)

(58) Field of Classification Search
None
See application file for complete search history.

(56) References Cited

U.S. PATENT DOCUMENTS

| | | | | |
|---|---|---|---|---|
| 2007/0219714 | A1* | 9/2007 | Uchida | G06F 16/29 |
| | | | | 701/438 |
| 2007/0237361 | A1* | 10/2007 | Sandor | G06K 9/00476 |
| | | | | 382/104 |
| 2009/0048950 | A1* | 2/2009 | Howell | G06Q 10/06 |
| | | | | 705/30 |

(Continued)

FOREIGN PATENT DOCUMENTS

| | | |
|---|---|---|
| WO | 2009/066393 A1 | 5/2009 |
| WO | 2009066392 A1 | 5/2009 |

OTHER PUBLICATIONS

International Search Report for PCT/JP2018/019462, dated Aug. 21, 2018.

(Continued)

*Primary Examiner* — Christopher J Raab
(74) *Attorney, Agent, or Firm* — Sughrue Mion, PLLC

(57) ABSTRACT

In order to improve the accuracy of a facility search, first adding means of a facility search system adds, to a facility, area information indicating an area when the area information indicating the area where the facility is located therein is input. Second adding means adds the area information to another facility to which the area information is not added when a position of the another facility is included in a region that is based on positions of a group of facilities to which the same area information is added. Facility search means executes a facility search based on the area information added to each facility.

12 Claims, 27 Drawing Sheets

(56) References Cited

U.S. PATENT DOCUMENTS

| | | | |
|---|---|---|---|
| 2009/0271281 A1* | 10/2009 | Kang | G06Q 10/02 |
| | | | 705/26.1 |
| 2011/0167065 A1* | 7/2011 | Toyoda | G01C 21/32 |
| | | | 707/737 |
| 2018/0268376 A1* | 9/2018 | Kang | G06Q 50/163 |

OTHER PUBLICATIONS

Search Report dated Mar. 10, 2021, from the European Patent Office in application No. 18919944.1.

Haklay M et al., OpenStreetMap: user-generated street maps. IEEE Pervasive computing IEEE Service Center, vol. 7, No. 4 Oct. 1, 2008, XP011236557, pp. 12-18 (7 pages total).

"Potlatch 2/Primer—OpenStreetMap Wiki", Retrieved from the Internet: URL:https://web.archive.org/web/20171209024043/https://wiki.openstreetmap.org/wiki/Potlatch_2/Primer, Dec. 9, 2017, retrieved on Feb. 26, 2021, XP055780171, ( 8 pages total).

* cited by examiner

FIG.4
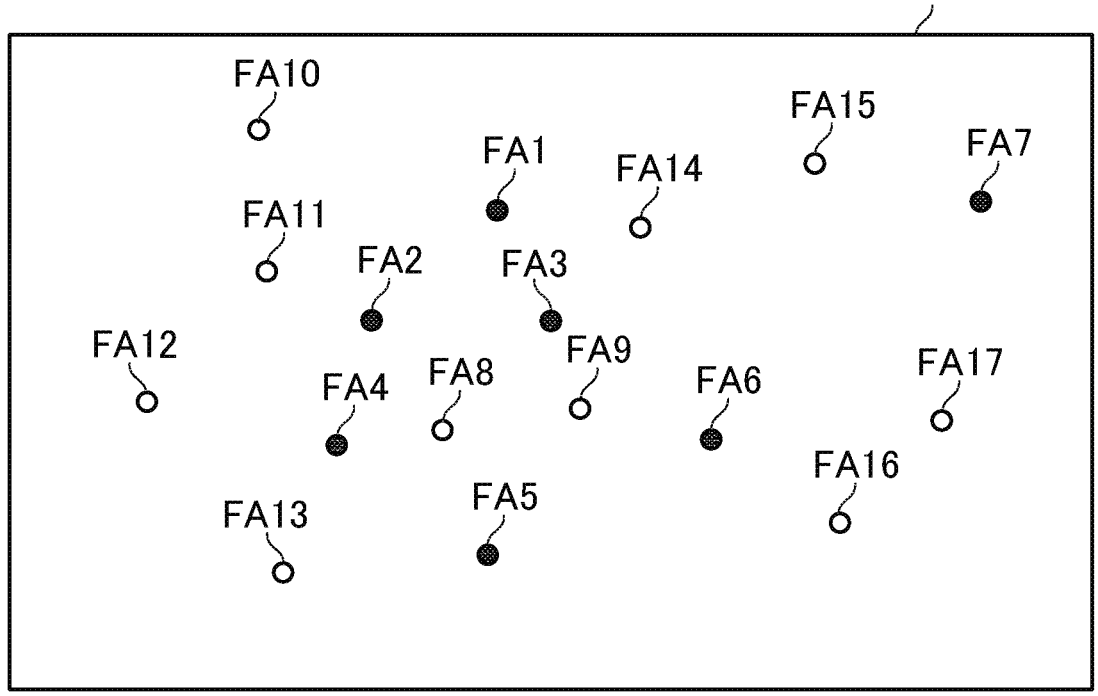
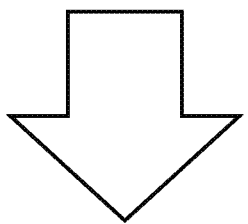
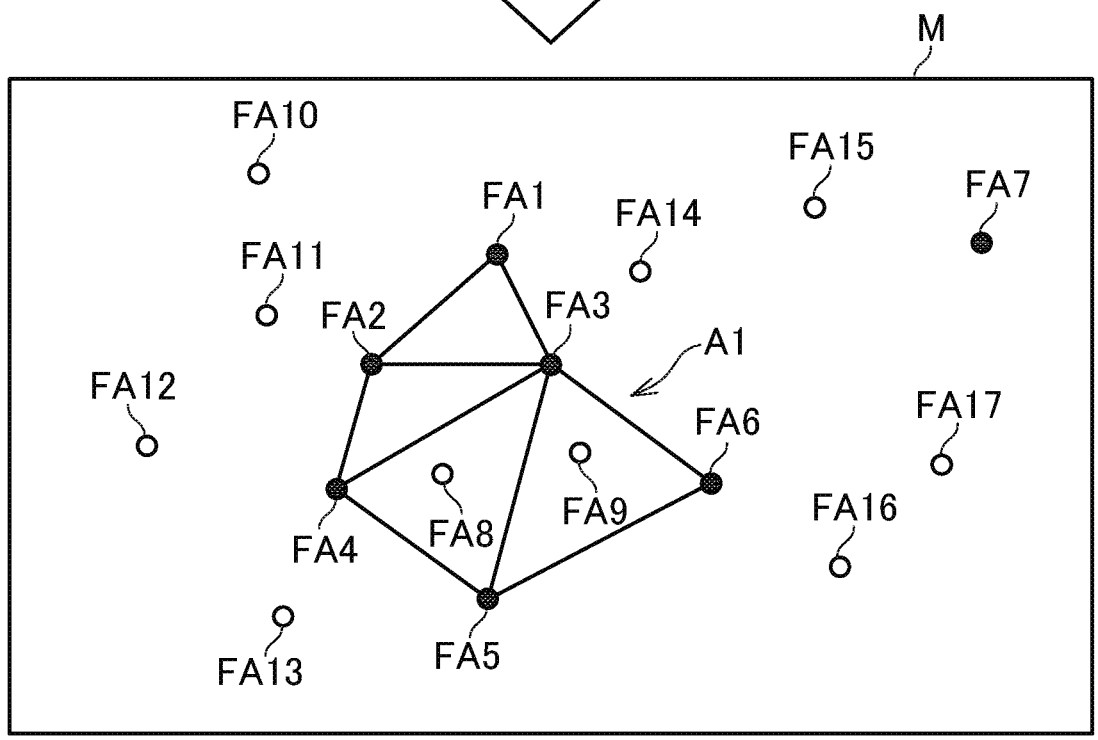

FIG.6
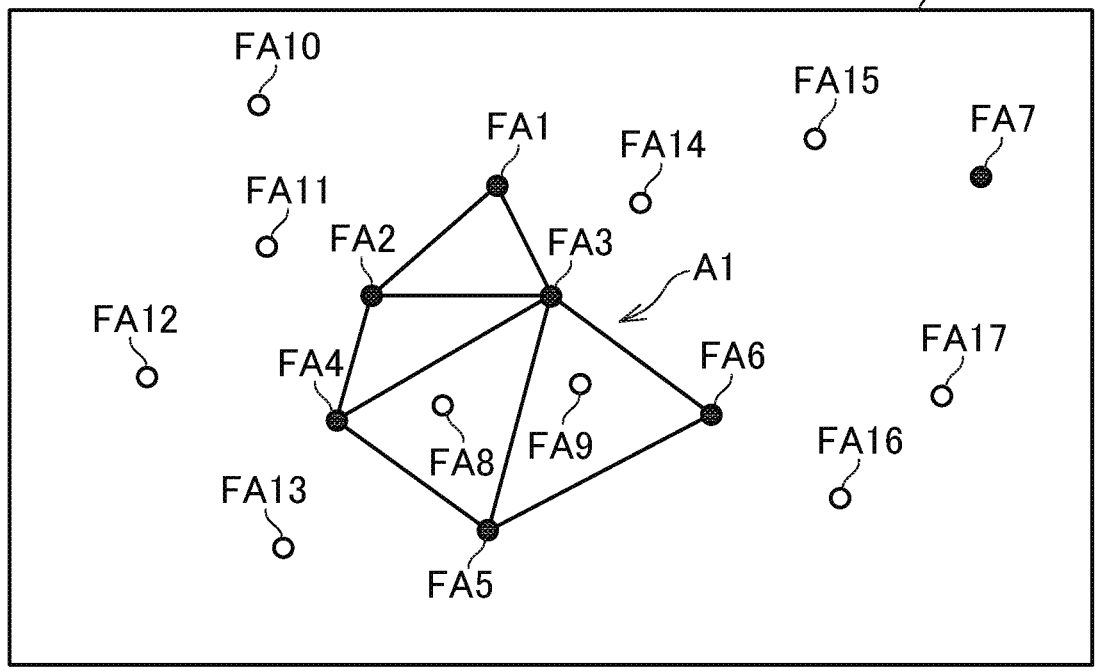
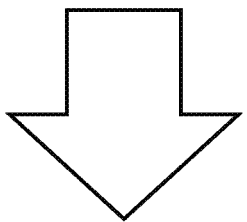
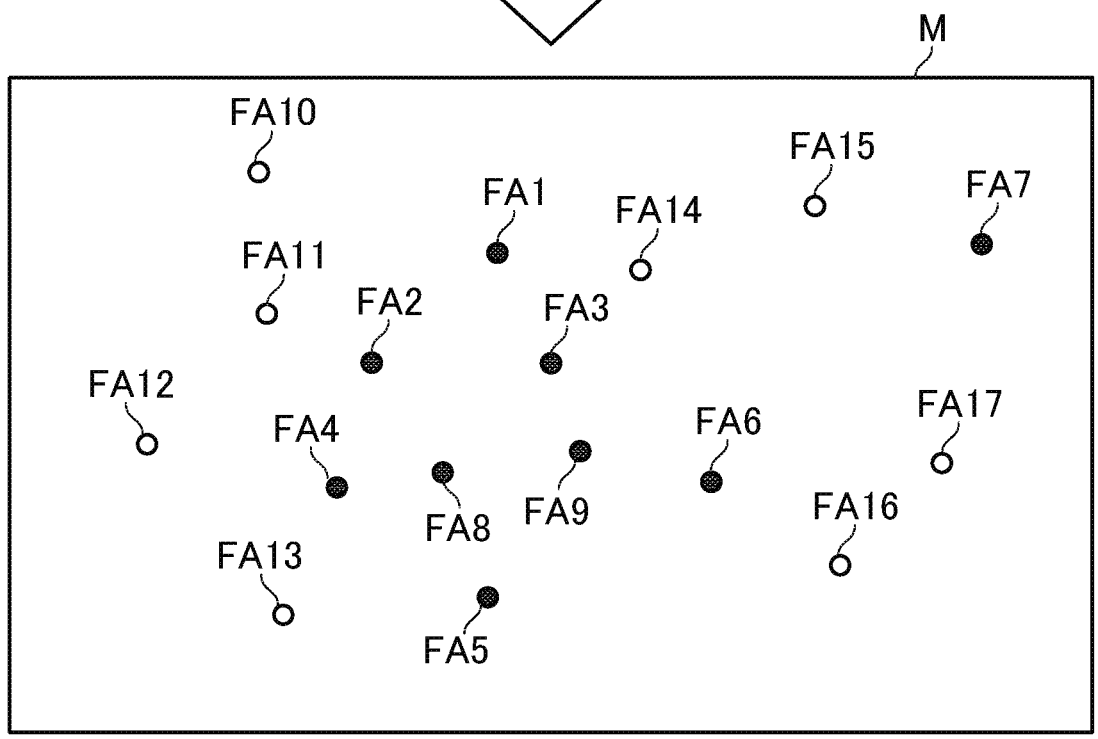

FIG.10

| FACILITY ID | FACILITY INFORMATION ||||||| |
| --- | --- | --- | --- | --- | --- | --- | --- |
| | FACILITY NAME | CONTENT | DESCRIPTION | ADDRESS | LATITUDE/LONGITUDE INFORMATION | PLACE TAG | PAGE ADDRESS |
| f00001 | RESTAURANT A | c00001.jpg | ... TRAINED IN A FAMOUS HOTEL | ... KARUIZAWA-MACHI, NAGANO PREFECTURE | (X1,Y1) | XXX RESORT | f00001 | ... |
| f00002 | SOUVENIR SHOP B | c00002.jpg | ... SELLS LOCAL SPECIALTIES | ... KARUIZAWA-MACHI, NAGANO PREFECTURE | (X2,Y2) | – | f00002 | ... |
| f00003 | HOTEL C | c00003.jpg | ... IS AN AUTHENTIC HOTEL | ... KARUIZAWA-MACHI, NAGANO PREFECTURE | (X3,Y3) | XXX RESORT | f00003 | ... |
| ... | ... | ... | ... | ... | ... | ... | ... |

DB

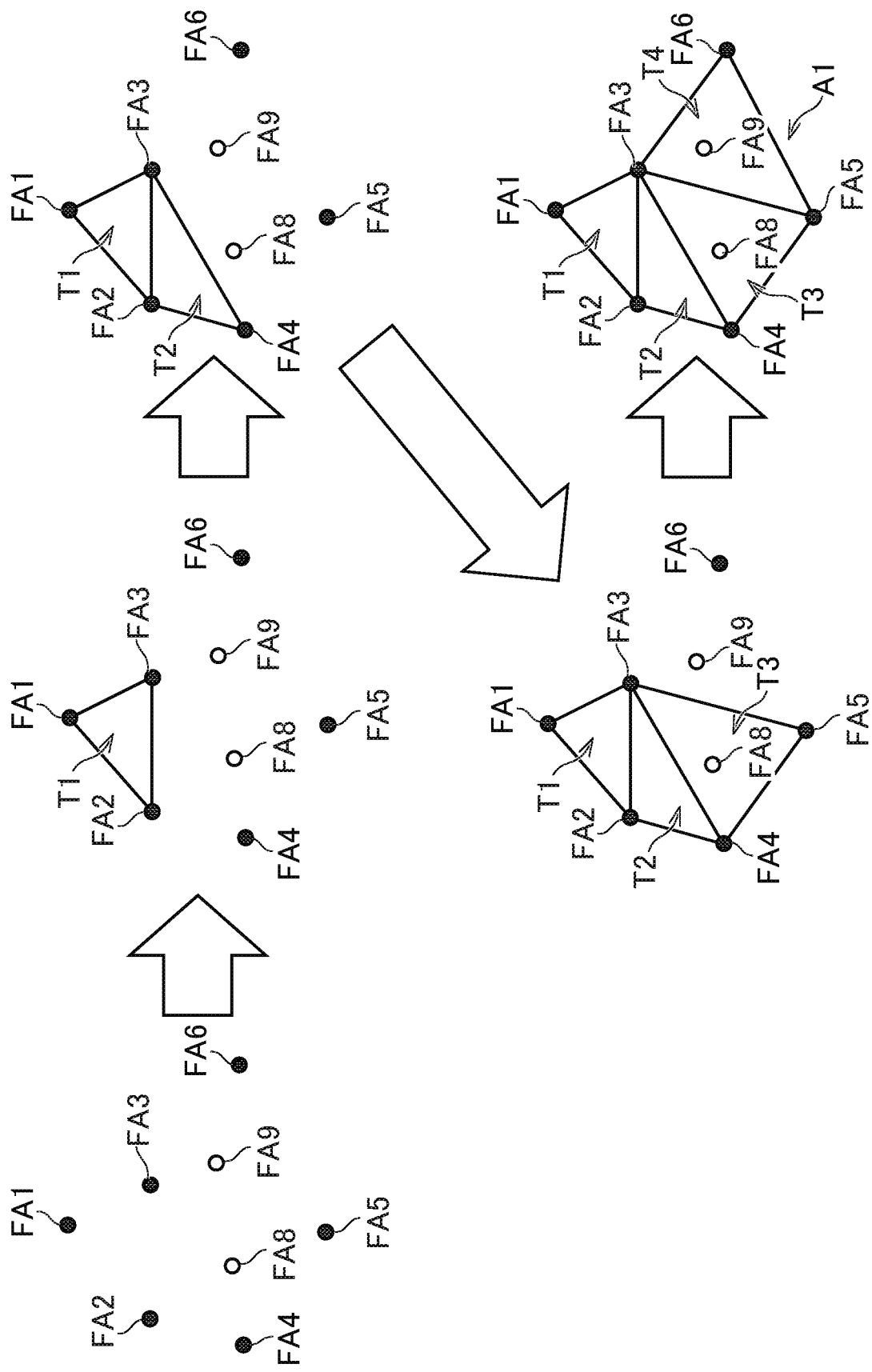

FIG. 17

| FACILITY ID | FACILITY NAME | CONTENT | FACILITY INFORMATION ||||| ACTION INFORMATION | PAGE ADDRESS |
| | | | DESCRIPTION | ADDRESS | LATITUDE/LONGITUDE INFORMATION | PLACE TAG | | |
|---|---|---|---|---|---|---|---|---|
| f00001 | RESTAURANT A | c00001.jpg | ... TRAINED IN A FAMOUS HOTEL | ... KARUIZAWA-MACHI, NAGANO PREFECTURE | (X1,Y1) | XXX RESORT | 52 TIMES | f00001 |
| f00002 | SOUVENIR SHOP B | c00002.jpg | ... SELLS LOCAL SPECIALTIES | ... KARUIZAWA-MACHI, NAGANO PREFECTURE | (X2,Y2) | – | – | f00002 |
| f00003 | HOTEL C | c00003.jpg | ... IS AN AUTHENTIC HOTEL | ... KARUIZAWA-MACHI, NAGANO PREFECTURE | (X3,Y3) | XXX RESORT | 7 TIMES | f00003 |
| ... | ... | ... | ... | ... | ... | ... | ... | ... |

| FACILITY ID | FACILITY NAME | CONTENT | DESCRIPTION | ADDRESS | FACILITY INFORMATION ||||
|---|---|---|---|---|---|---|---|---|
| | | | | | LATITUDE LONGITUDE INFORMATION | PLACE TAG | STOCK INFORMATION | PAGE ADDRESS |
| f00001 | RESTAURANT A | c00001.jpg | ... TRAINED IN A FAMOUS HOTEL | ... KARUIZAWA-MACHI, NAGANO PREFECTURE | (X1,Y1) | XXX RESORT | TABLE SEATS: 5 , COUNTER SEATS: 12 ... | f00001 |
| f00002 | SOUVENIR SHOP B | c00002.jpg | ... SELLS LOCAL SPECIALTIES | ... KARUIZAWA-MACHI, NAGANO PREFECTURE | (X2,Y2) | - | - | f00002 |
| f00003 | HOTEL C | c00003.jpg | ... IS AN AUTHENTIC HOTEL | ... KARUIZAWA-MACHI, NAGANO PREFECTURE | (X3,Y3) | XXX RESORT | SINGLE ROOM: 15 , DOUBLE ROOM: 6 ... | f00003 |
| ... | ... | ... | ... | ... | ... | ... | ... | ... |

DB

FIG.23
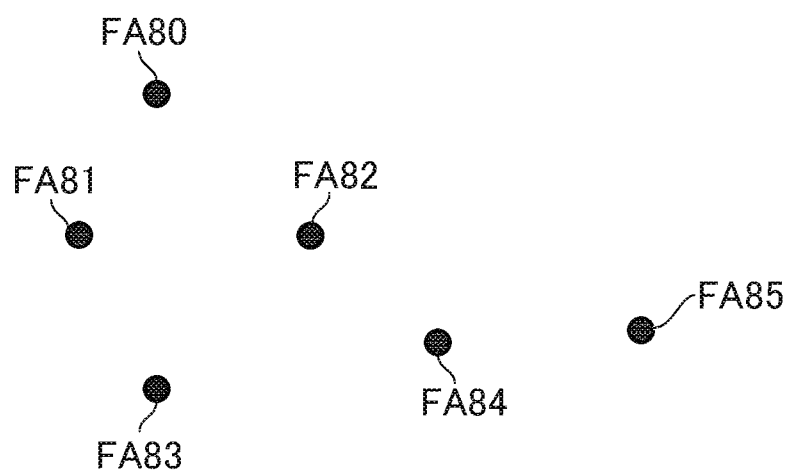
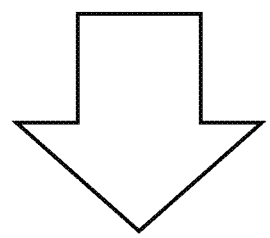
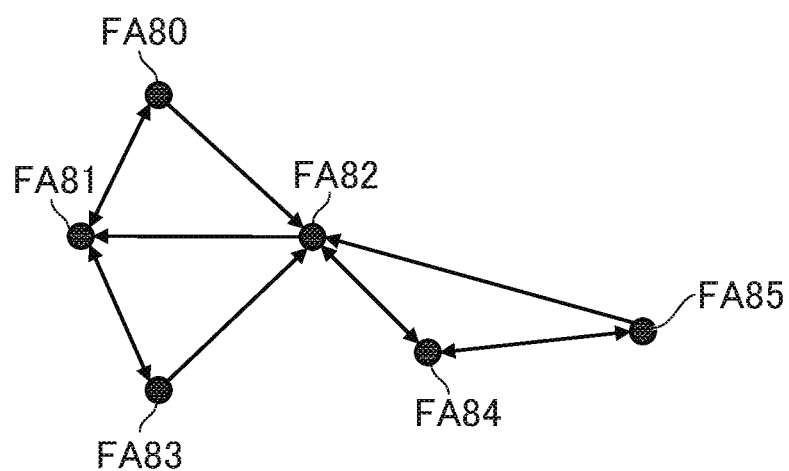

FIG.25
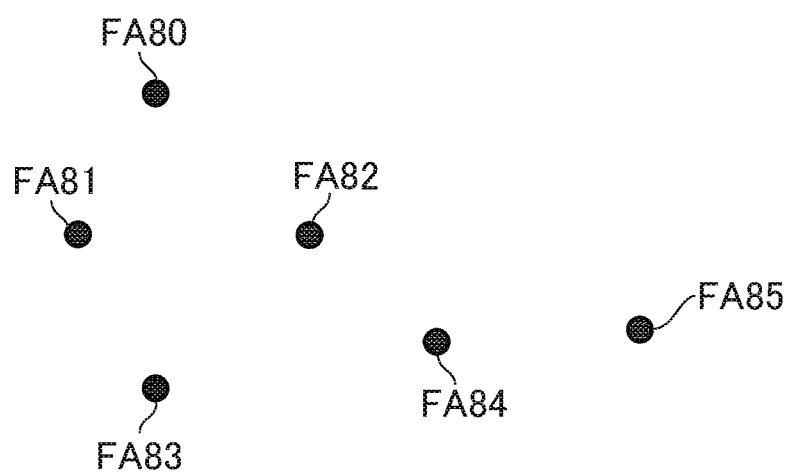
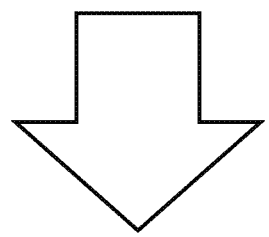
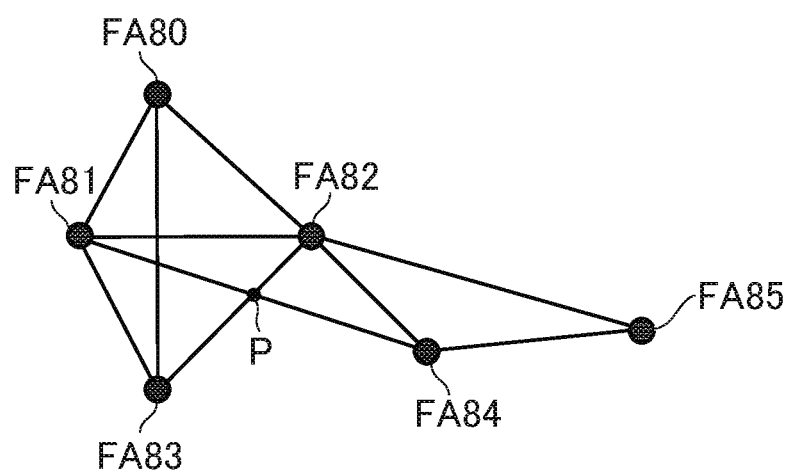

FACILITY SEARCH SYSTEM, FACILITY SEARCH METHOD, AND PROGRAM FOR ADDING AREA INFORMATION OF A FACILITY BY USING A PLACE TAG OF ANOTHER FACILITY CLOSE TO THE FACILITY

CROSS REFERENCE TO RELATED APPLICATIONS

This application is a National Stage of International Application No. PCT/JP2018/019462 filed May 21, 2018.

TECHNICAL FIELD

The present invention relates to a facility search system, a facility search method, and a program.

BACKGROUND ART

Hitherto, there has been known a technology of searching for a desired facility. In Patent Literature 1, there is described a technology involving setting, on a map, circles centered at positions of facilities retrieved in a keyword search, and adding, to an area obtained by connecting portions overlapped by those circles, a name of, for example, a public facility in the area as an area name. In this technology, area names are displayed on a terminal of a user in a selectable manner, and when the user selects an area name, facilities in an area indicated by the area name are displayed.

CITATION LIST

Patent Literature

[PTL 1] WO 2009/066393 A1

SUMMARY OF INVENTION

Technical Problem

In general, an area name different from a location name prepared by a system may facilitate recognition of an area in which facilities are located. However, in the technology of Patent Literature 1, an address or positional information is simply associated with each facility, and an area name itself is not added as an index of the facility. It is conceivable to allow each facility to specify the area name of its own as an index, but each facility does not always specify an appropriate area name. As a result, even when the user specifies an area name to execute a search, an appropriate facility is not retrieved, leading to a failure to improve the accuracy of the search.

The present invention has been made in view of the above-mentioned problem, and has an object to provide a facility search system, a facility search method, and a program, which enable improvement of the accuracy of a search.

Solution to Problem

In order to solve the above-mentioned problem, a facility search system according to one embodiment of the present invention includes: first adding means for adding, to a facility, area information of a name of an area when the area information indicating the area where the facility is located therein is input; second adding means for adding the area information to another facility to which the area information is not added when a position of the another facility is included in a region that is based on positions of a group of facilities to which the same area information is added; and facility search means for executing a facility search based on the area information added to each facility.

A facility search method according to one embodiment of the present invention includes: a first adding step of adding, to a facility, area information of a name of an area when the area information indicating the area where the facility is located therein is input; a second adding step of adding the area information to another facility to which the area information is not added when a position of the another facility is included in a region that is based on positions of a group of facilities to which the same area information is added; and a facility search step of executing a facility search based on the area information added to each facility.

A program according to one embodiment of the present invention causes a computer to function as: first adding means for adding, to a facility, area information of a name of an area when the area information indicating the area where the facility is located therein is input; second adding means for adding the area information to another facility to which the area information is not added when a position of the another facility is included in a region that is based on positions of a group of facilities to which the same area information is added; and facility search means for executing a facility search based on the area information added to each facility.

In one aspect of the present invention, the second adding means is configured to set the region based on positions of a group of facilities that have a distance to a closest facility smaller than a threshold value among the group of facilities to which the same area information is added.

In one aspect of the present invention, the facility search system further includes handling means for handling, when a first group of facilities and a second group of facilities, to which the same area information is added, have a distance equal to or larger than a threshold value, the area information added to the first group of facilities and the area information added to the second group of facilities as separate pieces of area information.

In one aspect of the present invention, the facility search system further includes: inquiry means for inquiring of the another facility whether to allow the second adding means to add the area information; and response acquisition means for acquiring a response from the another facility, and the second adding means is configured to add the area information to the another facility based on the response.

In one aspect of the present invention, the second adding means is configured to set the region based on a polygon connecting between respective positions of the group of facilities to which the same area information is added.

In one aspect of the present invention, the facility search system further includes recording means for recording, in action information, an action of a search user in response to a search result obtained by the facility search means, and the facility search means is configured to execute a facility search based further on the action information.

In one aspect of the present invention, the facility search system further includes stock information acquisition means for acquiring stock information on stock of each facility, and the facility search means is configured to: search for a facility with stock based further on the stock information on each facility; and execute a facility search while expanding a search region that is based on the area information until a predetermined number or more of facilities with stock are retrieved.

In one aspect of the present invention, the facility search system further includes: recording means for recording, in action information, an action of a search user in response to a search result obtained by the facility search means; and disabling means for disabling the area information added to each facility based on the action information.

In one aspect of the present invention, the facility search system further includes setting means for setting a prohibited region for prohibiting the area information to be added based on a position of the another facility when acquiring a response from the another facility to the effect that the area information is not allowed to be added, and the second adding means is configured to add the area information to the another facility based on the prohibited region.

In one aspect of the present invention, the facility search system further includes determination means for determining, when a plurality of regions determined based on a plurality of pieces of area information overlap with each other, an upper-lower relationship between the plurality of pieces of area information based on a manner of overlapping of the plurality of regions, and the facility search means is configured to execute a facility search based further on the upper-lower relationship determined by the determination means.

Advantageous Effects of Invention

According to the present invention, it is possible to improve the accuracy of a search.

BRIEF DESCRIPTION OF DRAWINGS

FIG. 4 is a diagram for illustrating a situation in which an added region is set on the map.

FIG. 6 is a diagram for illustrating a situation in which a place tag is set in facilities.

FIG. 10 is a table for showing an example of storage of data into a facility database.

FIG. 11 is a diagram for illustrating details of a method of setting an added region.

FIG. 17 is a table for showing an example of storage of data into a facility database in Modification Example (1) of the present invention.

FIG. 18 is a table for showing an example of storage of data into a facility database in Modification Example (2) of the present invention.

FIG. 23 is a diagram for illustrating a situation in which the added region is set in accordance with the pattern 1.

FIG. 25 is a diagram for illustrating a situation in which the added region is set in accordance with the pattern 2.

DESCRIPTION OF EMBODIMENTS

1. Entire Configuration of Facility Search System

Figure 1:
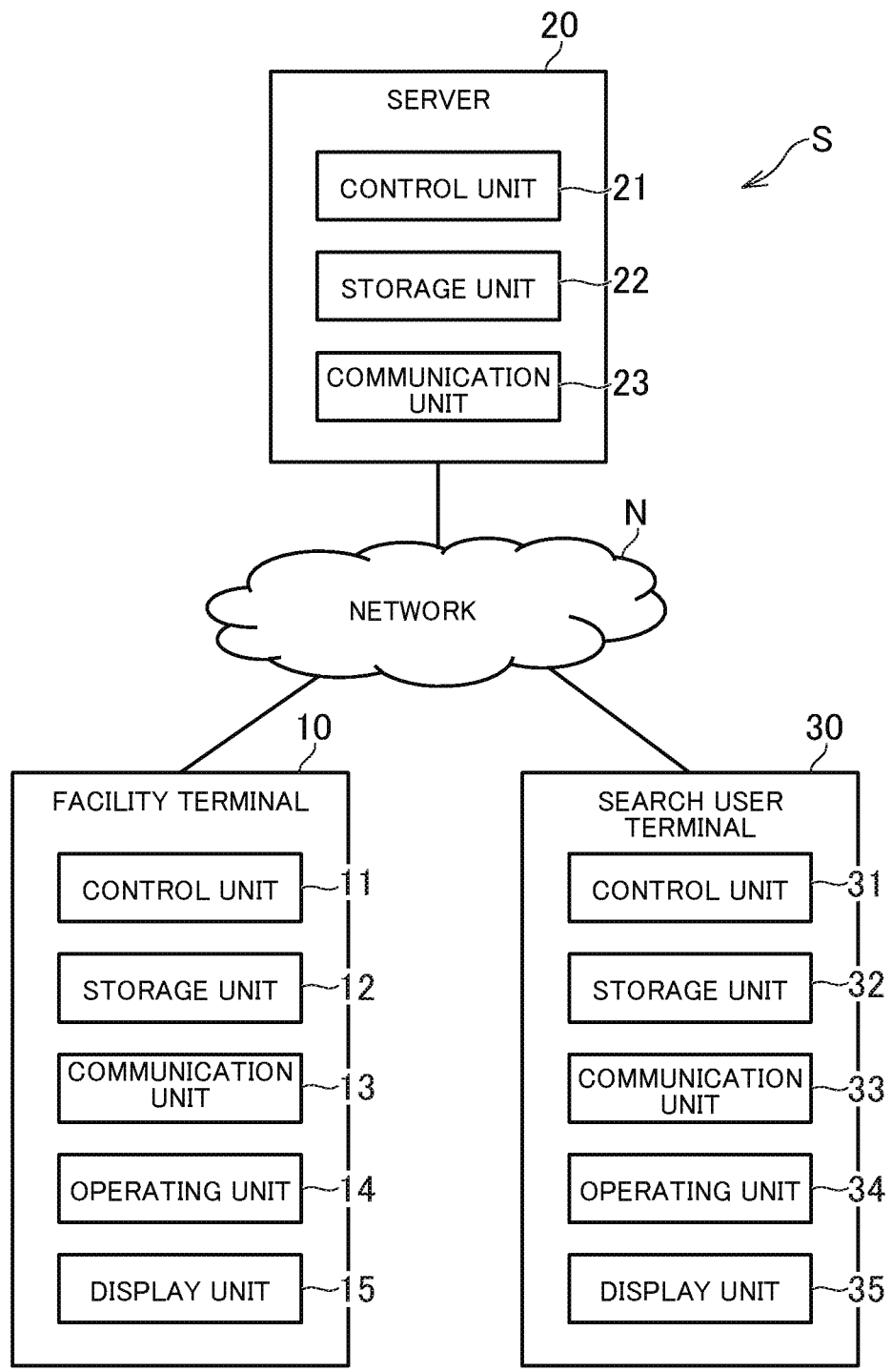
FIG. 1 is a diagram for illustrating an entire configuration of a facility search system.

Now, a description is given of a facility search system according to an exemplary embodiment of the present invention. FIG. 1 is a diagram for illustrating an entire configuration of the facility search system. As illustrated in FIG. 1, a facility search system S includes a facility terminal 10, a server 20, and a search user terminal 30, and those components can connect to a network N, for example, the Internet. In FIG. 1, one facility terminal 10, one server 20, and one search user terminal 30 are illustrated. However, there may be a plurality of facility terminals 10, a plurality of servers 20, and a plurality of search user terminals 30. For example, there may be at least one facility terminal 10 for each facility.

The facility terminal 10 is a computer to be operated by a person in charge of a facility. The facility is a building or a place to be used for a predetermined purpose, and is, for example, a hotel, a restaurant, a shop, a shopping mall, a hospital, a park, a stadium, an event site, a theme park, a station, an airport, a stop, a public facility, or a tourist facility. The person in charge is only required to be a user having a relationship with the facility, and may be, for example, an employee of the facility or an administrator who is entrusted with information management by the facility.

For example, the facility terminal 10 is a cell phone (including a smartphone), a portable information terminal (including a tablet computer), or a personal computer. In this embodiment, the facility terminal 10 includes a control unit 11, a storage unit 12, a communication unit 13, an operating unit 14, and a display unit 15.

The control unit 11 includes at least one microprocessor. The control unit 11 executes processing in accordance with programs and data stored in the storage unit 12. The storage unit 12 includes a main memory unit and an auxiliary memory unit. For example, the main memory unit is a volatile memory, for example, a RAM, and the auxiliary memory unit is a non-volatile memory such as a ROM, an EEPROM, a flash memory, or a hard disk drive.

The communication unit 13 is a communication interface for wired communication or wireless communication, and performs data communication via the network. The operating unit 14 is an input device, and is, for example, a pointing device such as a touch panel and a mouse, a keyboard, or a button. The operating unit 14 transmits details of operation by the user to the control unit 11. The display unit 15 is, for example, a liquid crystal display unit or an organic EL display unit. The display unit 15 displays an image in accordance with an instruction of the control unit 11.

The server 20 is a server computer. The server 20 includes a control unit 21, a storage unit 22, and a communication unit 23. The physical configurations of the control unit 21, the storage unit 22, and the communication unit 23 may be similar to those of the control unit 11, the storage unit 12, and the communication unit 13, respectively.

The search user terminal 30 is a computer to be operated by a search user. The "search user" is a user who searches for a facility. In other words, the search user is a user who is provided with a search result, and can also be referred to as "end user". Provision of the search result refers to reception of the search result from the server 20, and refers to displaying or downloading of a search result. For example, the search user uses the facility search system S to look up the location of a facility or to reserve a facility.

For example, the search user terminal 30 is a cell phone (including a smartphone), a portable information terminal (including a tablet computer), or a personal computer. In this embodiment, the search user terminal 30 includes a control unit 31, a storage unit 32, a communication unit 33, an operating unit 34, and a display unit 35. The physical configurations of the control unit 31, the storage unit 32, the communication unit 33, the operating unit 34, and the display unit 35 may be similar to those of the control unit 11, the storage unit 12, the communication unit 13, the operating unit 14, and the display unit 15, respectively.

Programs and data to be described as being stored into the storage units 12, 22, and 32 may be supplied thereto via the network N. Further, the respective hardware configurations of the computers are not limited to the above-mentioned examples, and various types of hardware can be applied thereto. For example, the hardware configuration may include a reading unit (e.g., an optical disc drive or a memory card slot) configured to read a computer-readable information storage medium, or an input/output unit (e.g., a USB port) configured to input and output data to/from an external device. For example, the program and the data stored in the information storage medium may be supplied to each of the computers through intermediation of the reading unit or the input/output unit.

2. Outline of Facility Search System

The facility search system S searches for a facility that matches a search condition input by a search user from among a plurality of facilities. The search condition is a query for searching, and various kinds of conditions such as a keyword, a location, a genre, a category, an attribute, or a numerical value (e.g., price range or date of use) can be specified as the search condition.

In this embodiment, the facility owns its page, and the facility search system S displays a page of the facility selected by a search user on the search user terminal 30. The page is prepared for each facility, and is viewed through use of, for example, a browser or an application of the search user terminal 30. The page may be a so-called webpage, website, or a home page. For example, each facility registers in the server 20 facility information to be displayed on its page.

The facility information is information only on a facility, and is information such as a name of the facility, a genre, a title of the page, content such as an image or moving image, a description, an address of the facility, latitude/longitude information, a phone number, or an email address. The description is a sentence introducing the facility, and may be, for example, a sentence indicating a product or service provided by the facility or a sentence indicating a method of reserving or using the facility, for example.

In this embodiment, a description is given of a case in which the facility information is used as a search index. However, the facility information is not particularly required to be an index. Further, all the items of the facility information are not required to be an index, and a part thereof may be an index. For example, when a person in charge of a facility operates the facility terminal 10 to log in to the server 20, an information input screen for inputting the facility information is displayed on the display unit 15.

Figure 2:
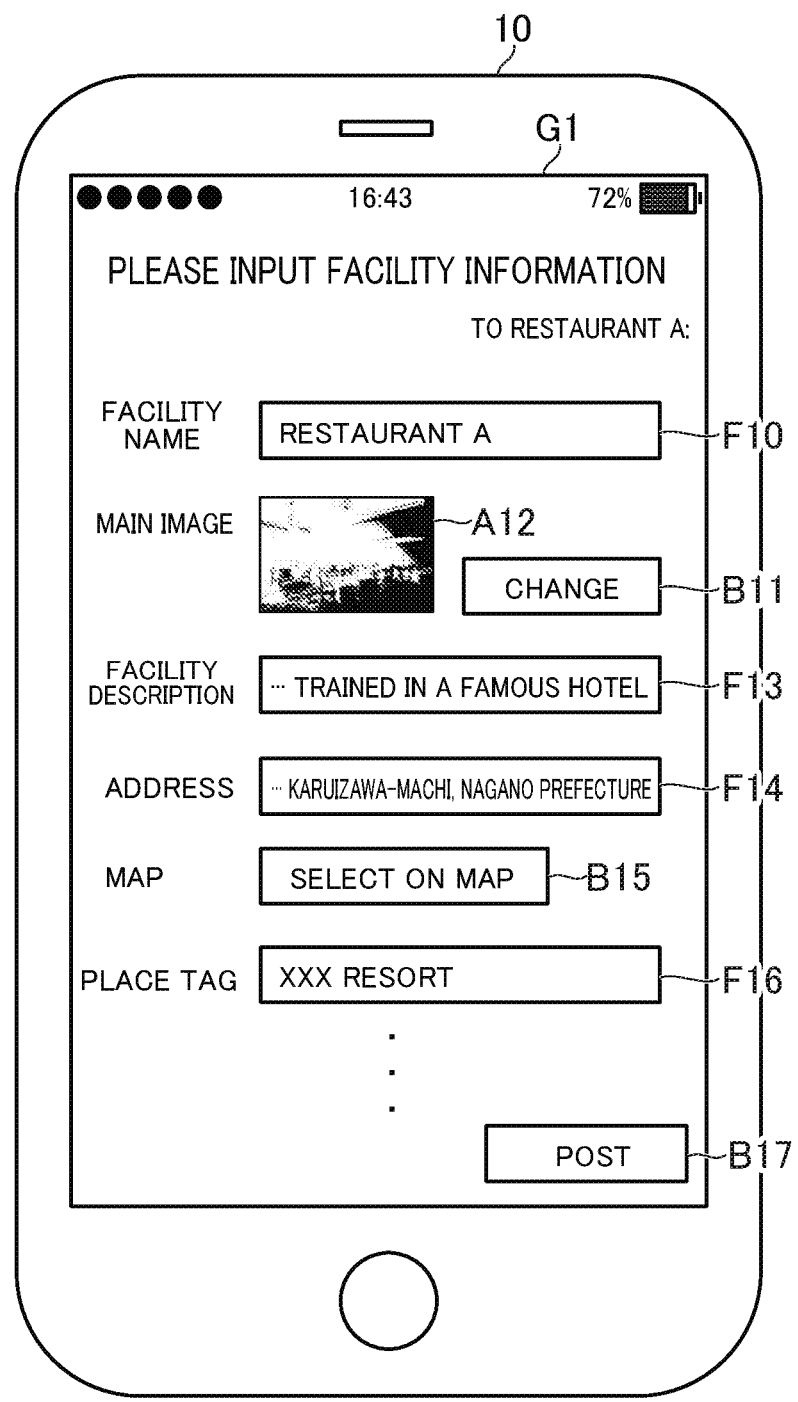
FIG. 2 is a diagram for illustrating an example of an information input screen.

FIG. 2 is a diagram for illustrating an example of the information input screen. As illustrated in FIG. 2, an input form F10 for inputting a facility name is displayed on an information input screen G1. A person in charge of the facility inputs a character string into the input form F10 to input the facility name.

Further, for example, a button B11 for uploading an image to be displayed on a page of the facility is displayed on the information input screen G1, and an uploaded image is displayed on a display region A12. Further, for example, an input form F13 for inputting a description of the facility is displayed on the information input screen G1. A person in charge of the facility inputs a character string into the input form F13 to input the description of the facility.

Further, for example, an input form F14 for inputting an address of the facility is displayed on the information input screen G1. A person in charge of the facility inputs a postal code or a character string into the input form F14 to input the address of the facility. Further, for example, a button B15 for inputting latitude/longitude information on the facility is displayed on the information input screen G1. When a person in charge of the facility selects the button B15, a map is displayed on the display unit 15, and the latitude/longitude information is input by specifying a position on the map.

Further, for example, an input form F16 for inputting a place tag is displayed on the information input screen G1. The place tag is an example of area information in one embodiment of the present invention. Thus, a description of "place tag" in this embodiment can be replaced with "area information".

The place tag is information on the name of an area including the position of a facility. In other words, the place tag is an area name input in order to classify facilities. The place tag includes a character string indicating the area name. In addition to the character string, the place tag may include a specific symbol, such as "#" or "%", which enables identification of the place tag. That is, such a symbol may be used to enable identification of whether the character string is a place tag or just a character string.

For example, the place tag is not required to be a name prepared by the server 20, and may be a name input by a person in charge of the facility, or a name input by a person (e.g., search user) who does not belong to the facility. The place tag may or may not indicate an actual location name.

When the place tag indicates an actual location name, a location name itself included in the address may be set as a place tag, or an abbreviation of the location name may be set as a place tag.

On the contrary, when the place tag does not indicate an actual location name, for example, the place tag may indicate a popular name of the area, or may indicate an old name that is no longer used. In other cases, for example, the place tag may indicate a name of a famous facility inside or near the area, a name of a famous sightseeing spot inside or near the area, or a name of an event to be held inside or near the area.

For example, a person in charge of the facility inputs a character string into the input form F16 to input a place tag of the facility. The method of inputting a place tag is not limited thereto, and a place tag may be input by any method. For example, a place tag may be input in the description, or a list of place tags added to other nearby facilities may be displayed, and a place tag may be selected from the list.

In the example of FIG. 2, it is assumed that a facility of "Restaurant A" is located in an area of famous facilities, namely, "XXX Resort", and tourists or the mass media call this area "XXX Resort" area. The phrase "XXX Resort" is not an actual location name, but is a name enabling identification of the area. Thus, a person in charge of "Restaurant A" specifies "XXX Resort" as its own place tag.

The facility information input on the information input screen G1 is registered in the server 20, and is used for displaying a facility page or as a search index. For example, when the search user specifies a place tag, a facility to which this place tag is added is searched for. For example, when the search user executes a search by including the place tag of "XXX Resort" in the search condition, "Restaurant A", to which this place tag is added, is retrieved as the search result.

A person in charge of the facility is not required to input all the items of the information input screen G1, and may input only a part of the items. Thus, a place tag may not be added to some facilities. For example, when a person in charge of "souvenir shop B" near "XXX Resort" does not particularly input a place tag on the information input screen G1, a place tag is not added to "souvenir shop B". Thus, even when the search user executes a search by including the place tag of "XXX Resort" in the search condition, "souvenir shop B" is not retrieved as the search result.

For example, when the place tag of "XXX Resort" is frequently used in a search, it may be desired that the place tag be added to "souvenir shop B". However, it is difficult for a person in charge of "souvenir shop B" to notice this fact, and thus the facility search system S according to this embodiment proposes to add a place tag when a facility to which the place tag is not added is surrounded by facilities to which the place tag is added.

Figure 3:
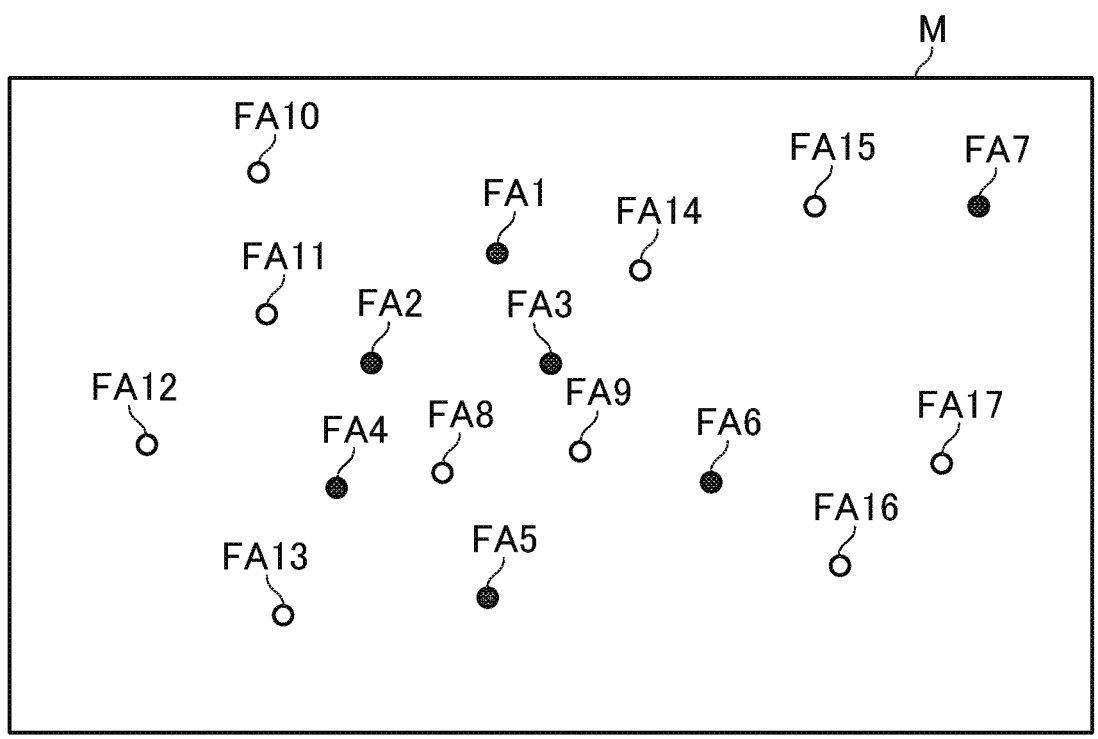
FIG. 3 is a diagram for illustrating a part of a map including a facility to which a place tag is added and a facility to which a place tag is not added.

FIG. 3 is a diagram for illustrating a part of a map including a facility to which a place tag is added and to which a facility a place tag is not added. In FIG. 3, facilities are indicated by circles, and there are facilities FA1 to FA15 on a map M. Objects such as a road and a line are also illustrated on the map M, but are omitted in FIG. 3.

On the map M, a black circle indicates a facility to which a place tag is added, and a white circle indicates a facility to which a place tag is not added. In the example of FIG. 3, it is assumed that the place tag of "XXX Resort" is added to each of the facilities FA1 to FA7, and the place tag is not added to the facilities FA8 to FA15.

As illustrated in FIG. 3, for example, the facilities FA8 and FA9 are surrounded by the facilities FA1 to FA6 to which the place tag is added, and the place tag may be desired to be added to the facilities FA8 and FA9. The facility search system S sets a region on the map M based on positions of a group of facilities to which the place tag is added in order to identify a facility to which the place tag is desired to be added. This region is hereinafter referred to as "added region".

FIG. 4 is a diagram for illustrating a situation in which an added region is set on the map M. As illustrated in FIG. 4, among the facilities FA1 to FA7, to which the place tag is added, the facility FA7 is located away from the other facilities FA1 to FA6. Thus, in this embodiment, the place tag added to the facility FA7 is determined to have a low reliability and is excluded from the setting of the added region A1. The added region A1 is set based on the facilities FA1 to FA6 close to one another.

The added region A1 may have any shape, but in this embodiment, it is assumed that the added region A1 is a polygon connecting between the facilities FA1 to F6. For example, the added region A1 is formed by a triangle enclosed by the facility FA1, which is selected first, and two other facilities identified to be close to the facility FA1. In the example of FIG. 4, the added region A1 is a region enclosed by a line connecting between the facilities FA1, FA2, FA4, FA5, FA6, FA3, and FA1 in the stated order.

In this embodiment, among the facilities FA8 to FA15, in which the place tag is not set, the facilities FA8 and FA9 inside the added region A1 are determined to be facilities to which the place tag is desired to be added. The place tag may automatically (forcibly) be added to the facilities FA8 and FA9, but in some cases, whether or not the place tag is appropriate for the facilities FA8 and FA9 cannot be determined only based on a positional relationship on the map. For example, it may be difficult to determine whether or not the place tag is appropriate even when route information or three-dimensional building information obtained from the map is fully used. Thus, in this embodiment, the server 20 inquires of each of the facilities FA8 and FA9 whether or not to add the place tag.

For example, the facilities FA8 and FA9 may be owned by a rival company of "XXX Resort", and thus the server 20 may inquire of the facilities FA8 and FA9 whether or not to add the place tag of "XXX Resort" or similar tags. Further, for example, when the place tag indicates a venue of an event of "YYY fireworks display" and a high-rise building is located between the facilities FA8 and FA9 and a launch location of fireworks, the fireworks cannot be seen at the facilities FA8 and FA9. Thus, the server 20 may inquire of the facilities FA8 and FA9 whether or not to add the place tag of "YYY fireworks display" to the facilities FA8 and FA9. When the facility terminals 10 of the facilities FA8 and FA9 have received an inquiry from the server 20, an inquiry screen is displayed on the display unit 15.

Figure 5:
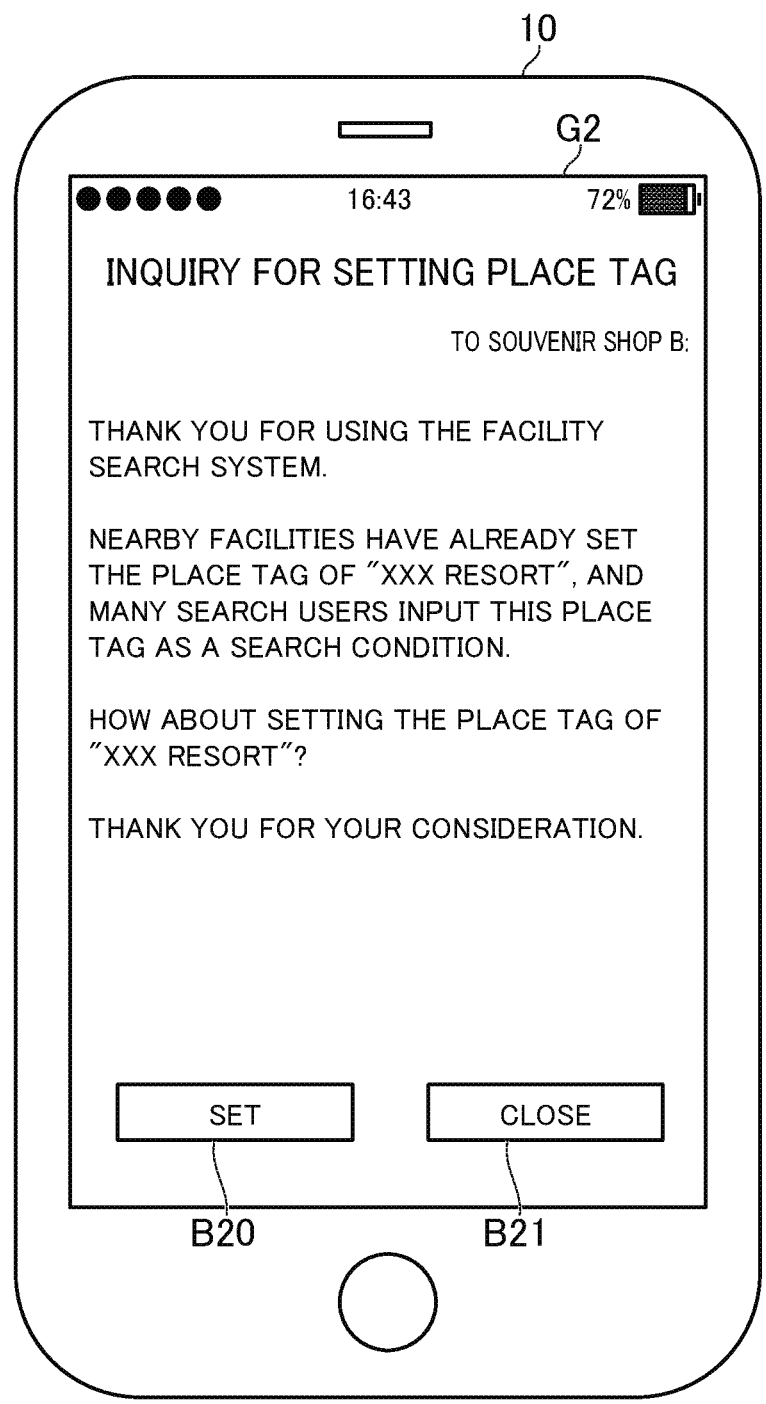
FIG. 5 is a diagram for illustrating an example of an inquiry screen.

FIG. 5 is a diagram for illustrating an example of the inquiry screen. As illustrated in FIG. 5, a message proposing to add a place tag is displayed on an inquiry screen G2. A person in charge of each of the facilities FA8 and FA9 checks details of the message, and selects a button B20 when agreeing to add the place tag to its facility, or selects a button B21 when there is no such particular necessity. Now, a description is given of a case in which a person in charge of each of the facilities FA8 and FA9 has selected the button B20.

FIG. 6 is a diagram for illustrating a situation in which a place tag is set in the facilities FA8 and FA9. As illustrated in FIG. 6, when the person in charge of each of the facilities FA8 and FA9 selects the button B20, a place tag is set in the facilities FA8 and FA9, and the facilities FA8 and FA9 can be searched for with the place tag. Thus, when the search user searches for a facility by including the place tag of "XXX Resort" in the search condition, the facilities FA8 and FA9 are also included in the search result.

Next, a description is given of a flow of searching for a facility by the search user. For example, when the search user performs a predetermined operation on the search user terminal 30, a facility search screen for inputting a search condition is displayed on the display unit 35.

Figure 7:
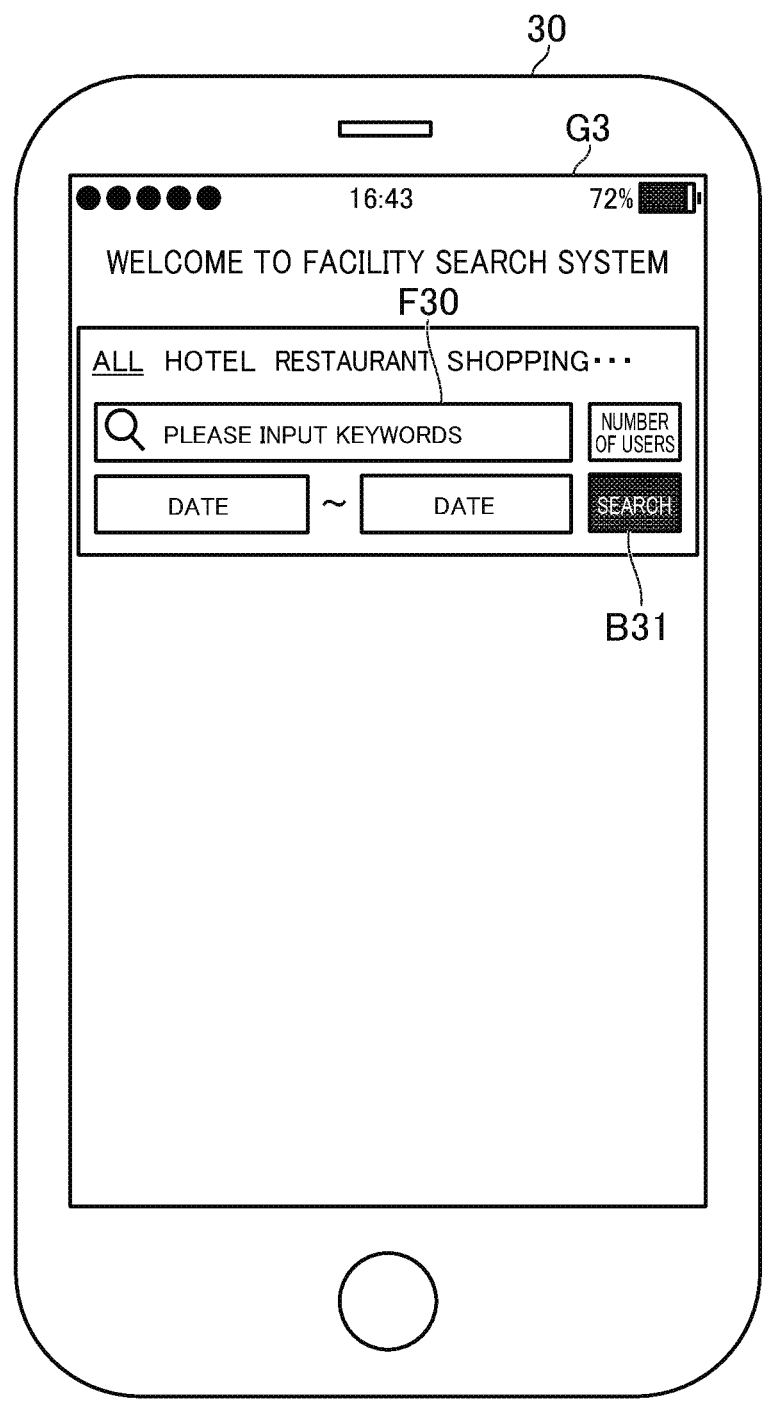
FIG. 7 is a diagram for illustrating an example of a facility search screen.

FIG. 7 is a diagram for illustrating an example of the facility search screen. As illustrated in FIG. 7, an input form F30 for inputting a search condition is displayed on a facility search screen G3. The search user inputs a search condition into the input form F30. Various kinds of conditions such as a keyword, a category of the facility, a date of use, or the number of users may be input as the search condition. However, the following description is given of a case in which the character string of a place tag is input. For example, when the search user inputs the character string of the place tag of "XXX Resort" on the input form F30 and selects a button B31, a search with the character string serving as a query is executed, and a search result screen indicating the search result is displayed on the display unit 35.

Figure 8:
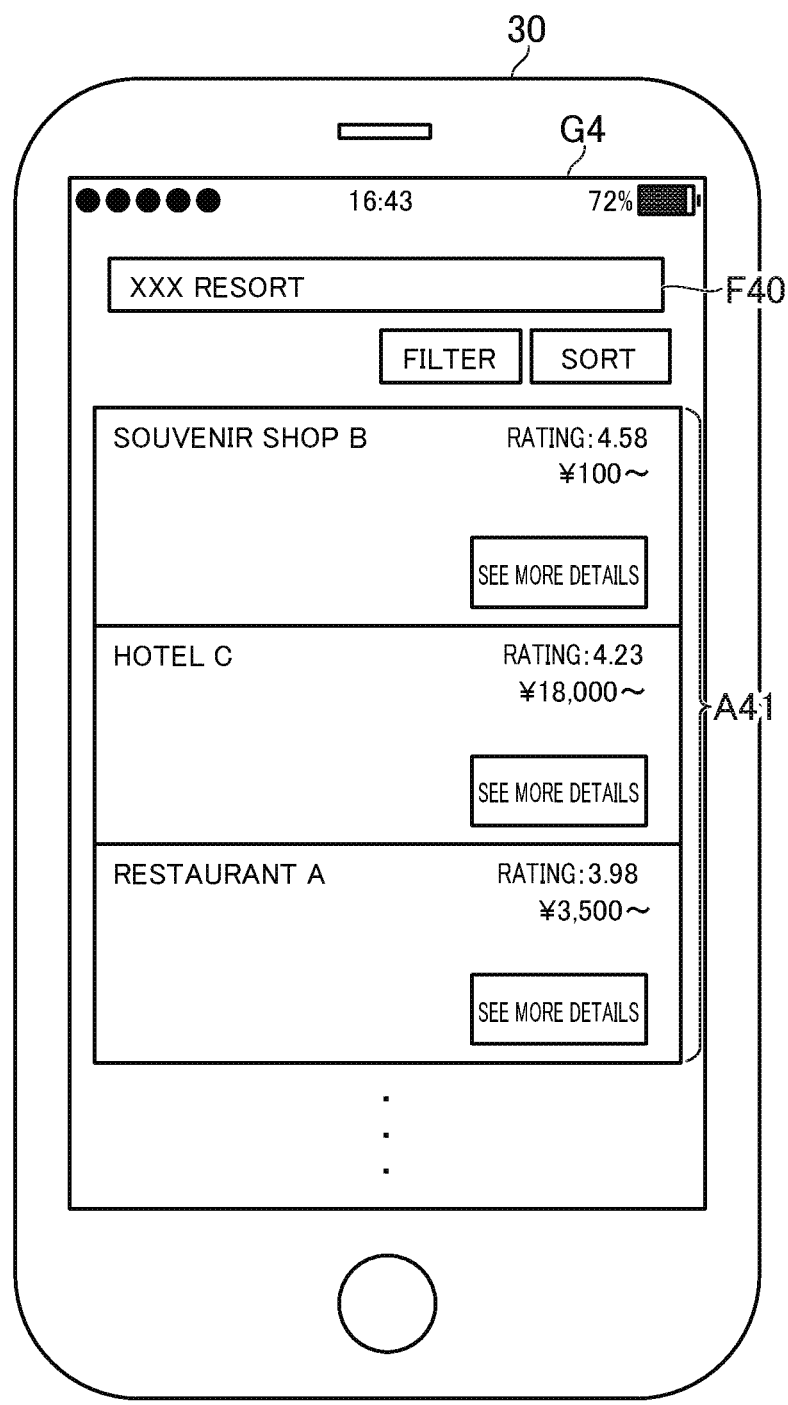
FIG. 8 is a diagram for illustrating an example of a search result screen.

FIG. 8 is a diagram for illustrating an example of the search result screen. As illustrated in FIG. 8, the search condition used in a search is displayed on an input form F40 of a search result screen G4. The search user can change the search condition on the input form F40 to execute a search again. A list of facilities retrieved in a search is displayed on a display region A41 of the search result screen G4. In this description, the place tag of "XXX Resort" has been input as the search condition, and thus facilities to which this place tag is added are displayed on the display region A41. For example, as described above with reference to FIG. 6, not only the facilities FA1 to FA7, to which the place tag is added in advance, but also the facilities FA8 and FA9, to which the place tag is added afterwards, are included in the search result.

As described above, with the facility search system S according to this embodiment, when a facility to which a place tag is not added is included in the added region A1, the place tag is added to the facility to improve the accuracy of a search. In the following, a description is given of details of this technology.

3. Functions to be Implemented in Embodiment

Figure 9:
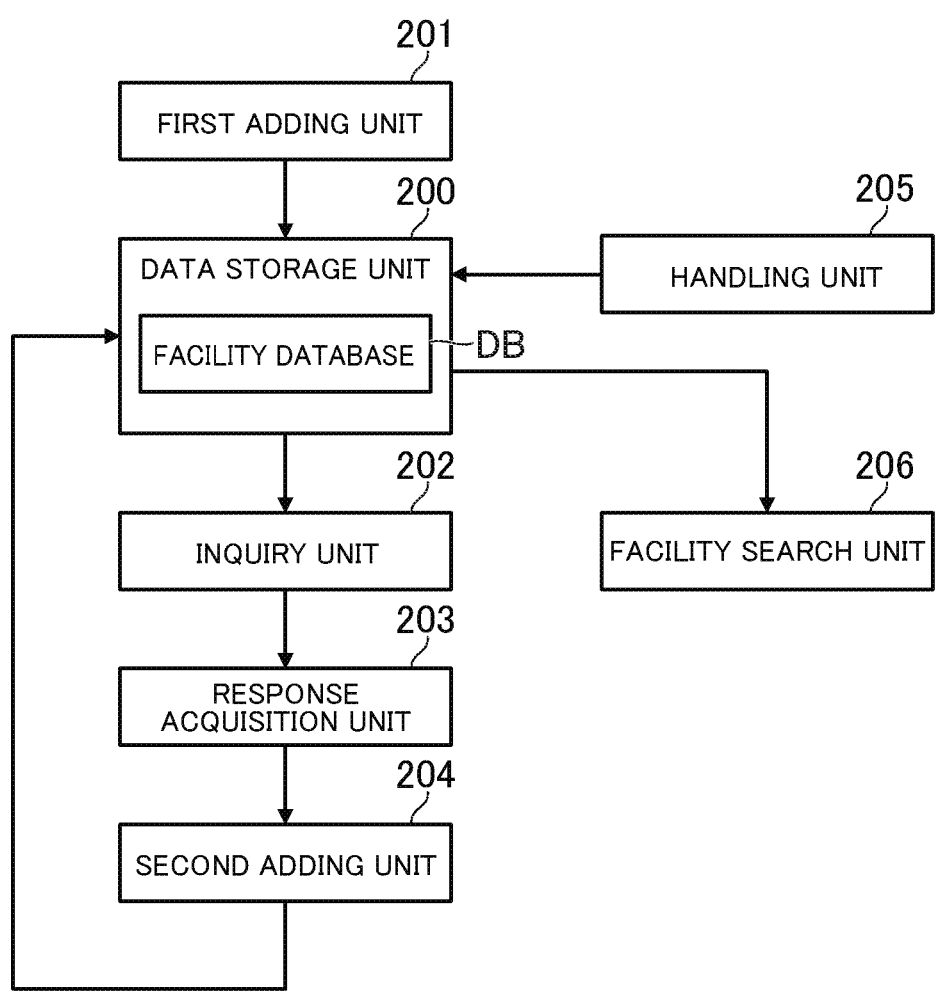
FIG. 9 is a functional block diagram for illustrating an example of functions to be implemented by a facility search system according to an embodiment of the present invention.

FIG. 9 is a functional block diagram for illustrating an example of functions to be implemented by the facility search system S according to an embodiment of the present invention. In this embodiment, a description is given of a case in which primary functions are implemented by the server 20. However, as in modifications example of the present invention described later, at least two of the facility terminal 10, the server 20, and the search user terminal 30 may implement the functions in a distributed manner.

As illustrated in FIG. 9, a data storage unit 200, a first adding unit 201, an inquiry unit 202, a response acquisition unit 203, a second adding unit 204, a handling unit 205, and a facility search unit 206 are implemented by the facility search system S. The data storage unit 200, the first adding unit 201, the inquiry unit 202, the response acquisition unit 203, the second adding unit 204, the handling unit 205, and the facility search unit 206 are examples of storage means, first adding means, inquiry means, response acquisition means, second adding means, handling means, and facility search means, respectively.

[3-1. Data Storage Unit]

The data storage unit 200 is mainly implemented by the storage unit 22. The data storage unit 200 stores data required for performing a search. Now, a description is given of a facility database DB as an example of data to be stored in the data storage unit 200.

FIG. 10 is a table for showing an example of storage of data into the facility database DB. As shown in FIG. 10, the facility database DB is a database for storing various kinds of information on facilities. For example, facility information is stored into the facility database DB in association with a facility ID for uniquely identifying a facility.

As the facility information, for example, the name of a facility, content such as an image or a moving image, a description, an address, latitude/longitude information, a place tag, or a page address is stored. For example, when a person in charge of a facility inputs facility information on the information input screen G1, the facility information is stored into the facility database DB in association with the facility ID of the facility.

Data to be stored into the data storage unit 200 is not limited to the above-mentioned example. For example, the data storage unit 200 may store image data for displaying each of the information input screen G1, the inquiry screen G2, the facility search screen G3, and the search result screen G4. Further, for example, the data storage unit 200 may store map data on the map M. Various kinds of data can be applied as the map data itself, and for example, the map data may be two-dimensional map data or data in which three-dimensional geographical features are reflected.

[3-2. First Adding Unit]

The first adding unit 201 is mainly implemented by the control unit 21. When a place tag associated with the name of an area in which a facility is located is input, the first adding unit 201 adds the place tag to the facility.

"Adding a place tag to a facility" means setting the place tag as an index of the facility. In other words, "adding a place tag to a facility" means associating a facility ID with the place tag on a database. When a place tag is added to a facility, the place tag can be used to search for the facility. In this embodiment, storing a place tag into the facility database DB in association with a facility ID corresponds to adding a place tag to a facility.

In this embodiment, a description is given of a case in which a person in charge of a facility inputs a place tag. However, the search user or a user other than the search user may input a place tag. For example, the facility terminal 10 identifies a place tag input by a person in charge of a facility based on a detection signal from the operating unit 14. The facility terminal 10 transmits the identified place tag to the server 20 together with the facility ID of the facility. The server 20 receives the facility ID and the place tag, and the first adding unit 201 stores the received place tag into a record in which the received facility ID is stored in the facility database DB.

The first adding unit 201 may add only one place tag to a facility, or add a plurality of place tags to a facility. When a plurality of place tags are added to a facility, the first adding unit 201 may add the plurality of place tags all at once, or add the plurality of place tags one by one in a repeated manner. Further, there may be an upper limit on the number of place tags to be added to a facility, or there may not be such a particular upper limit.

[3-3. Inquiry Unit]

The inquiry unit 202 is mainly implemented by the control unit 21. The inquiry unit 202 inquires of other facilities whether or not to allow the second adding unit 204 to add a place tag. The phrase "other facilities" refers to facilities to which a place tag indicated by the added region A1 is not added among facilities included in the added region A1. In other words, the phrase "other facilities" refers to facilities that are to receive an inquiry.

For example, the inquiry unit 202 transmits display data on the inquiry screen G2 to the facility terminal 10 to make an inquiry. The display data may have any data format, and may be, for example, HTML data, or image data or text data for displaying a screen on an application. A response by the facility can be selected on the inquiry screen G2.

The term "response" refers to a response to an inquiry, and indicates, for example, any one of allowing to add a place tag and not allowing to add a place tag. The phrase "allowing to add a place tag" means instructing to add a place tag or desiring to add a place tag. The phrase "not allowing to add a place tag" means refusing to add a place tag or prohibiting a place tag from being added.

Various kinds of methods can be applied as the inquiry method itself, and the inquiry method is not limited to the above-mentioned example. For example, the inquiry unit 202 may make an inquiry by a method such as an email, a message by using a message application, a push notification, or a message by using a social networking service. Further, information for identifying the facility terminal 10 may be stored in the data storage unit 200 in advance, and the inquiry unit 202 may identify the facility terminal 10, which is to receive an inquiry, based on the information. This information may be, for example, an account of a facility, an email address, an ID of a message application, individual identification information on the facility terminal 10, or an account of a social networking service.

[3-4. Response Acquisition Unit]

The response acquisition unit 203 is mainly implemented by the control unit 21. The response acquisition unit 203 acquires responses from other facilities. The meanings of "other facilities" and "response" are as described above. The response acquisition unit 203 receives response data from the facility terminal 10 to acquire a response.

The response data is only required to be data indicating details of a response, and indicates, for example, any one of allowing to add a place tag and not allowing to add a place tag. For example, when the response data indicates a first value, this means that a place tag is not allowed to be added, whereas when the response data indicates a second value, this means that a place tag is not allowed to be added. In this embodiment, a response is selected on the inquiry screen G2, and thus the response data is data indicating which of the buttons B20 and B21 is selected.

For example, the facility terminal 10 identifies a response of the facility based on a detection signal from the operating unit 14. The facility terminal 10 transmits response data indicating the identified response to the server 20. For example, when a person in charge of the facility has selected the button B20, the facility terminal 10 transmits response data to the effect that a place tag is allowed to be added. Further, for example, when a person in charge of the facility has selected the button B21, the facility terminal 10 transmits response data to the effect that a place tag is not allowed to be added. The response acquisition unit 203 of the server 20 receives the response data to acquire a response from the facility.

A response is only required to be acquired by a method that depends on the inquiry method, and is not limited to the above-mentioned example. For example, the response acquisition unit 203 may acquire a response by a method such as an email, a message by using a message application, a push notification, or a message by using a social networking service.

[3-5. Second Adding Unit]

The second adding unit 204 is mainly implemented by the control unit 21. When a region that is based on positions of a group of facilities to which the same place tag is added includes positions of other facilities to which the place tag is not added, the second adding unit 204 adds the place tag to the other facilities.

The phrase "same place tag" means that the place tag is treated in the same manner as an index. For example, when the names of place tags are the same as each other, those place tags may be treated as the same place tag. Further, for example, areas with the same name may be present at totally different locations, and thus the condition for determining the same place tag may be such that the place tags have the same name and positions of groups of facilities to which those place tags are added are close to each other. The area name has orthographical variants, and thus the same place tag may be identified in consideration of orthographical variants even when the character string itself is different.

The phrase "group of facilities" is a general term for a plurality of facilities. The group of facilities include n (n is an integer of two or more) facilities, and may include any number of facilities. For example, the group of facilities may include only two facilities, or may include three to hundreds of facilities. Further, for example, the group of facilities may include a thousand or more facilities.

The "region that is based on positions of a group of facilities to which the same place tag is added" is a region that is determined based on the positions of the group of facilities, and is a region including at least the positions of the group of facilities. In this embodiment, the added region A1 is described as an example of this region. Thus, the description of the added region A1 in this embodiment can be replaced with the region that is based on positions of a group of facilities to which the same place tag is added.

The "position of a facility" is a position on the earth or on a map. The position of a facility is only required to be indicated by information enabling identification of an absolute position, and for example, is indicated by latitude/longitude information, coordinate information, or an address. In this embodiment, a description is given of a case in which the position of a facility is indicated by latitude/longitude information.

For example, the second adding unit 204 sets the added region A1 based on the position of at least one facility included in the group of facilities. In this embodiment, a description is given of a case in which the second adding unit 204 sets the added region A1 based on the positions of all the facilities included in the group of facilities, but may set the added region A1 based on the positions of a part of facilities included in the group of facilities. When the added region A1 is set based on the positions of a part of facilities, the position of a facility randomly selected from the group of facilities may be used, or only the positions of facilities having a large number of page views or reservations among the group of facilities may be used.

For example, the second adding unit 204 sets the added region A1 so that the added region A1 includes the positions of the group of facilities. The added region A1 may include all the positions of the group of facilities, or may include only the positions of a part of facilities. When the added region A1 includes only the positions of a part of facilities, the added region A1 may include a predetermined number (e.g., about several to several tens) or a predetermined proportion (e.g., about 50% to 90%) or more of facilities among the group of facilities to which place tag is added.

In this embodiment, the second adding unit 204 sets the added region A1 based on a polygon connecting between the positions of the group of facilities to which the same place tag is added. The polygon may have any number of vertices, and in this description, the polygon is set to be a triangle. However, the polygon may be a square, a pentagon, a hexagon, or a heptagon or more. For example, the second adding unit 204 sets the added region A1 by identifying, for each position of the group of facilities, the other two closest positions, and repeatedly setting a triangle connecting those three positions.

FIG. 11 is a diagram for illustrating details of the method of setting the added region A1. As illustrated in FIG. 11, first, the second adding unit 204 identifies two positions closest to the position of the facility FA1. In this description, the positions of the facilities FA2 and FA3 are identified, and thus the second adding unit sets a triangle T1 connecting between the facilities FA1, FA2, and FA3.

Next, the second adding unit 204 identifies two positions closest to the position of the facility FA2. The triangle T1 is already set for the facility FA1, and thus the facility FA1 is excluded from the target. In this case, the facilities FA3 and FA4 are identified, and thus the second adding unit sets a triangle T2 connecting between the facilities FA2, FA3, and FA4. After that, in the same manner, the second adding unit sets a triangle T3 connecting between the facilities FA3, FA4, and FA5, and a triangle T4 connecting between the facilities FA3, FA5, and FA6. At this point in time, all the facilities FA1 to FA6, to which a place tag is added, forma vertex of at least one triangle, and thus the second adding unit finishes setting of a triangle, and connects those four triangles to set the added region A1.

In this embodiment, the second adding unit 204 sets the added region A1 based on the positions of a group of facilities whose distance to the closest facility is smaller than a threshold value among the group of facilities to which the same place tag is added. The phrase "closest" means that the facility is closest in terms of distance. The second adding unit 204 identifies the closest facility based on the position of each facility, and determines whether or not the distance is equal to or larger than the threshold value. The threshold value may be set to be a fixed value, or may be set to a variable depending on the group of facilities or the place tag. When the threshold value is set to be a variable, the threshold value may be set higher as the number of facilities to which the place tag is added becomes larger.

In the example of FIG. 4, the place tag is set in the facility FA7, but the facility FA7 is away from the closest facility FA1 or FA3 among the group of facilities to which the same place tag is added. Thus, the second adding unit 204 does not refer to the position of the facility FA7 when setting the added region A1. Meanwhile, the distances of the facilities FA1 to FA6 to the closest facility are smaller than the threshold value, and thus the second adding unit 204 sets the added region A1 based on each position of the facilities FA1 to FA6.

In this embodiment, inquiries are made to other facilities, and thus the second adding unit 204 adds the place tag to the other facilities based on the responses. For example, when a response to the effect that a place tag is allowed to be added is acquired, the second adding unit 204 adds the place tag to the other facilities, whereas when a response to the effect that a place tag is not allowed to be added is acquired, the second adding unit 204 does not add the place tag to the other facilities. When the other facilities have not responded to the inquiries, the second adding unit 204 may automatically add the place tag, or in this case, may not add the place tag.

The method of setting the added region A1 is not limited to the above-mentioned example. For example, the second adding unit 204 may set, for each facility included in the group of facilities to which the same place tag is added, a region so that the region includes the position of the facility. Then, the second adding unit 204 may connect overlapping portions of the set regions to set the added region A1. The set region may have any shape, and may be a circle or a polygon.

For example, the second adding unit 204 may set, for each facility included in the group of facilities to which the same place tag is added, a circular region centered at the facility. Then, the second adding unit 204 may connect overlapping portions of the set circular regions to set the added region A1. Further, for example, the second adding unit 204 may set a circumscribed circle of the connected regions as the added region A1, or set a circumscribed rectangle of the connected regions as the added region A1.

Further, for example, the second adding unit 204 may set the added region A1 based on a center or center of gravity of the positions of the group of facilities to which the same place tag is added. The center or center of gravity is only required to be calculated based on a predetermined mathematical expression, and may be, for example, a simple average or weighted average of the positions of respective facilities. When the weighted average is used, the positions of respective facilities may be weighted in accordance with the density of those facilities, or may be weighted in accordance with the number of page views or reservations of each facility. The second adding unit 204 may set the added region A1 so that the added region A1 includes the center or center of gravity. For example, the second adding unit 204 may set a circle with a predetermined radius centered at the center or center of gravity as the added region A1, or seta polygon including the center or center of gravity as the added region A1. In this case, the added region A1 is not required to include all the facilities, and a part of facilities may be located outside the added region A1.

[3-6. Handling Unit]

The handling unit 205 is mainly implemented by the control unit 21. When a distance between a first group of facilities and a second group of facilities, to which the same place tag is added, is equal to or larger than a threshold value, the place tag added to the first group of facilities and the place tag added to the second group of facilities are handled as separate place tags.

Figure 12:
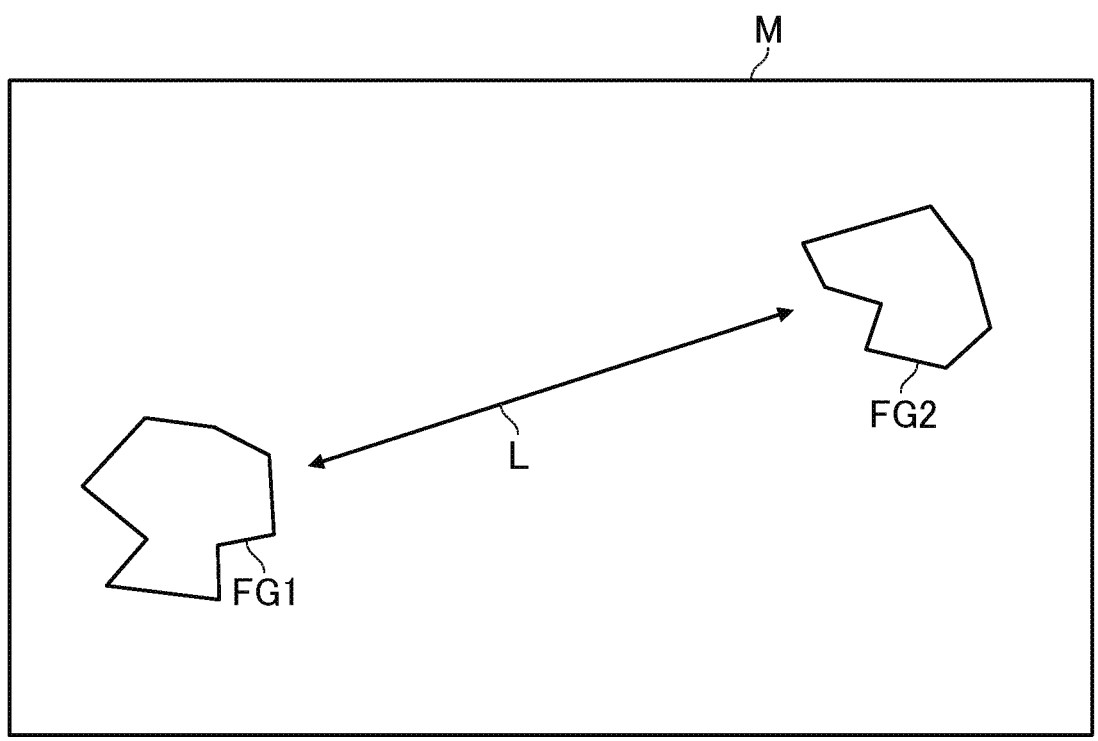
FIG. 12 is an explanatory diagram for illustrating processing to be executed by a handling unit.

FIG. 12 is an explanatory diagram for illustrating processing to be executed by the handling unit 205. As illustrated in FIG. 12, for example, the handling unit 205 groups facilities closest to each other and having a distance smaller than a first threshold value as the same group of facilities based on the positions of the group of facilities to which the same place tag of the same name is added. Then, when a first group of facilities FG1 and a second group of facilities FG2 are detected from the place tag of the same name, the handling unit 205 determines whether or not a distance L between those two groups of facilities is equal to or larger than the second threshold value. The second threshold value may be equal to the first threshold value, but in this description, it is assumed that the second threshold value is set to be larger than the first threshold value.

When the distance L between the first group of facilities FG1 and the second group of facilities FG2 is smaller than the second threshold value, the handling unit 205 handles the place tag added to the first group of facilities FG1 and the place tag added to the second group of facilities FG2 as the same place tag. That is, the handling unit 205 handles the first group of facilities FG1 and the second group of facilities FG2 as the same group of facilities, and enables those groups of facilities to be retrieved with the same place tag.

On the contrary, in a case where the distance between the first group of facilities FG1 and the second group of facilities FG2 is equal to or larger than the second threshold value, even when the place tag added to the first group of facilities FG1 and the place tag added to the second group of facilities FG2 have the same name, the handling unit 205 handles those groups of facilities as different place tags. For example, the handling unit 205 may add identification information before or after the area name indicated by the place tag so that the identification information identifies each group of facilities. Alternatively, the handling unit 205 may add identification information that indicates the same area name but internally identifies each group of facilities.

[3-7. Facility Search Unit]

The facility search unit 206 is mainly implemented by the control unit 21. The facility search unit 206 searches for a facility based on a place tag added to each facility. The facility search unit 206 searches for a facility with a search condition and a place tag, which are input by the search user, serving as a query and an index, respectively. Information other than the place tag may be set as an index, and for example, the facility search unit 206 may execute a facility search with information such as a facility name, a description, an address, or latitude/longitude information serving as an index.

For example, the facility search unit 206 determines whether or not there is a match for the search condition and the place tag stored in the facility database DB. The term "match" may refer to an exact match or a partial match. The facility search unit 206 acquires a facility to which a place tag matching the search condition is added, as a search result. The facility search unit 206 may execute a facility search by using a fuzzy search.

4. Processing to be Executed in this Embodiment

Next, a description is given of processing to be executed by the facility search system S. Now, a description is given of facility information registration processing for registering the facility information into the server 20, place tag adding processing for adding other facilities with place tags, and facility search processing for executing a facility search.

[4-1. Facility Information Registration Processing]

Figure 13:
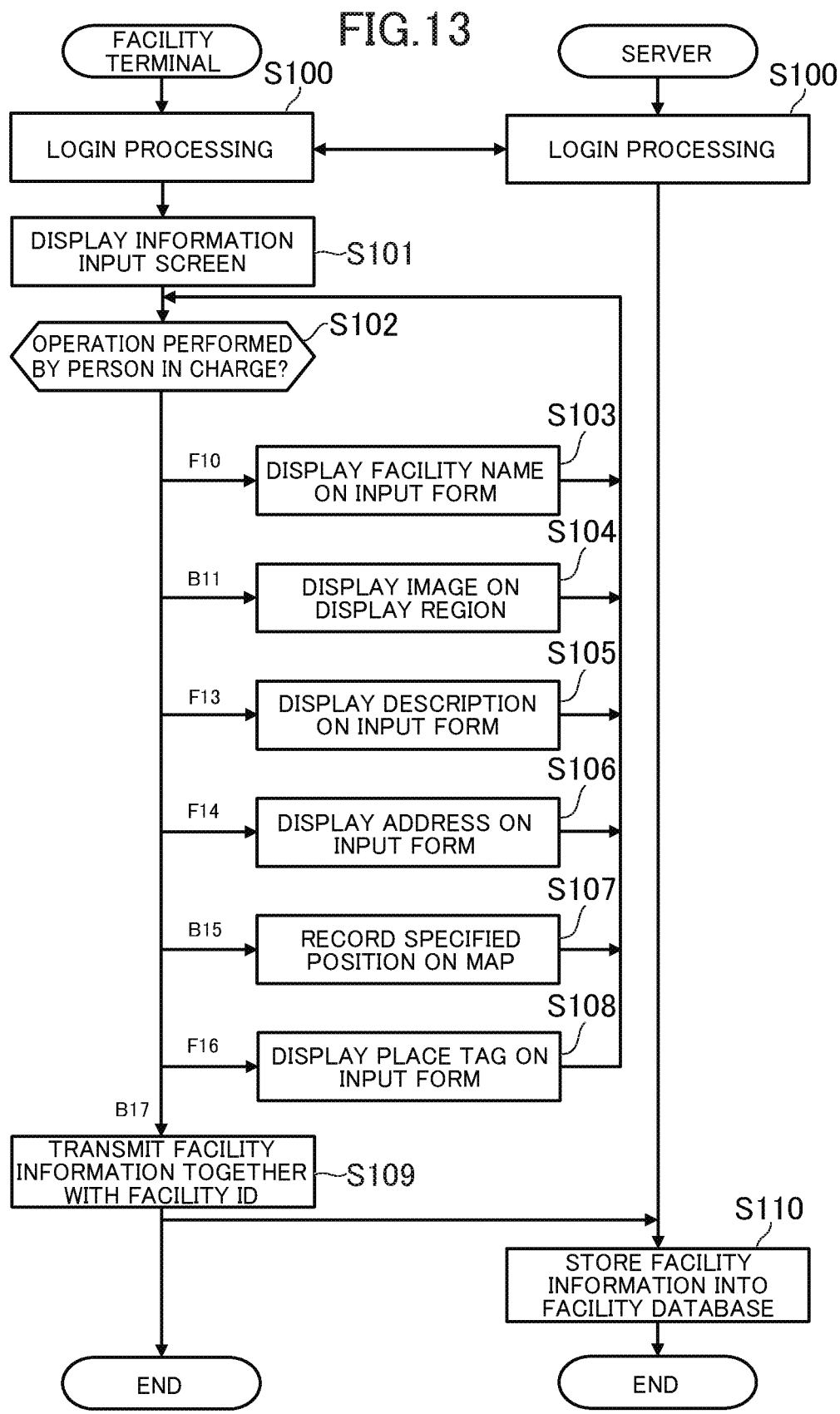
FIG. 13 is a flowchart for illustrating facility information registration processing.

FIG. 13 is a flowchart for illustrating the facility information registration processing. Processing illustrated in FIG. 13 is executed by the control units 11 and 21 operating in accordance with programs stored in the storage units 12 and 22, respectively. Processing described below is an example of processing to be executed by the functional blocks illustrated in FIG. 9.

As illustrated in FIG. 13, first, the facility terminal 10 and the server 20 execute predetermined login processing therebetween (Step S100), and when the login processing is successful, the control unit 11 displays the information input screen G1 on the display unit 15 (Step S101). In Step S100, when a person in charge of the facility operates the operating unit 14 to specify a URL on the information input screen G1 via a browser or start a predetermined application, the control unit 11 transmits an access request to the server 20. The access request may be a request having a predetermined data format, and for example, may include a facility ID. In Step S101, a person in charge of the facility may input an account and a password, or an account and a password stored in the storage unit 12 may be transmitted to the server 20.

The control unit 11 identifies an operation performed by a person in charge of the facility based on a detection signal from the operating unit 14 (Step S102). In this case, it is assumed that any one of an operation of inputting a facility name on the input form F10, an operation of selecting the button B11, an operation of inputting a facility description on the input form F13, an operation of inputting an address on the input form F14, an operation of selecting the button B15, an operation of inputting a place tag on the input form F16, and an operation of selecting a button B17 is performed.

When a facility name is input on the input form F10 (Step S102: F10), the control unit 11 displays the input facility name on the input form F10 (Step S103). In Step S103, the control unit 11 records the input facility name into the storage unit 12.

When the button B11 is selected in Step S102 (Step S102: B11), the control unit 11 displays a list of images of the facility on the display unit 15, and displays an image selected by a person in charge of the facility on the display region A12 (Step S104). In Step S104, the control unit 11 records information for identifying the selected image into the storage unit 12.

When a description is input on the input form F13 in Step S102 (Step S102: F13), the control unit 11 displays the input description on the input form F13 (Step S105). In Step S105, the control unit 11 records the input description into the storage unit 12. As described above, a place tag may be input within the description.

When an address is input on the input form F14 in Step S102 (Step S102: F14), the control unit 11 displays the input address on the input form F14 (Step S106). In Step S106, the control unit 11 records the input address into the storage unit 12.

When the button B15 is selected in Step S102 (Step S102: B15), the control unit 11 displays a map on the display unit 15, and records a position on the map, which is specified by the person in charge of the facility, into the storage unit 12 (Step S107). In Step S107, the control unit 11 records latitude/longitude information on the facility into the storage unit 12.

When a place tag is input on the input form F16 in Step S102 (Step S102: F16), the control unit 11 displays the input place tag on the input form F16 (Step S108). In Step S108, the control unit 11 records the input place tag into the storage unit 12.

When the button B17 is selected in Step S102 (Step S102: B17), the control unit 11 transmits the facility information to the server 20 together with the facility ID (Step S109). In Step S109, the control unit 11 transmits the facility information including, for example, the facility name and place tag recorded in the storage unit 12 in the processing of from Step S103 to Step S108. It is assumed that the facility ID is stored in advance in the storage unit 12.

When the server 20 has received the facility ID and the facility information, the control unit 21 stores the facility information into the facility database DB (Step S110), and the processing is finished. In Step S110, the control unit 21 identifies a record storing the received facility ID in the facility database DB, and stores the received facility information into the record. When the person in charge of the facility has input a place tag, the place tag is added to the facility.

[4-2. Place Tag Adding Processing]

Figure 14:
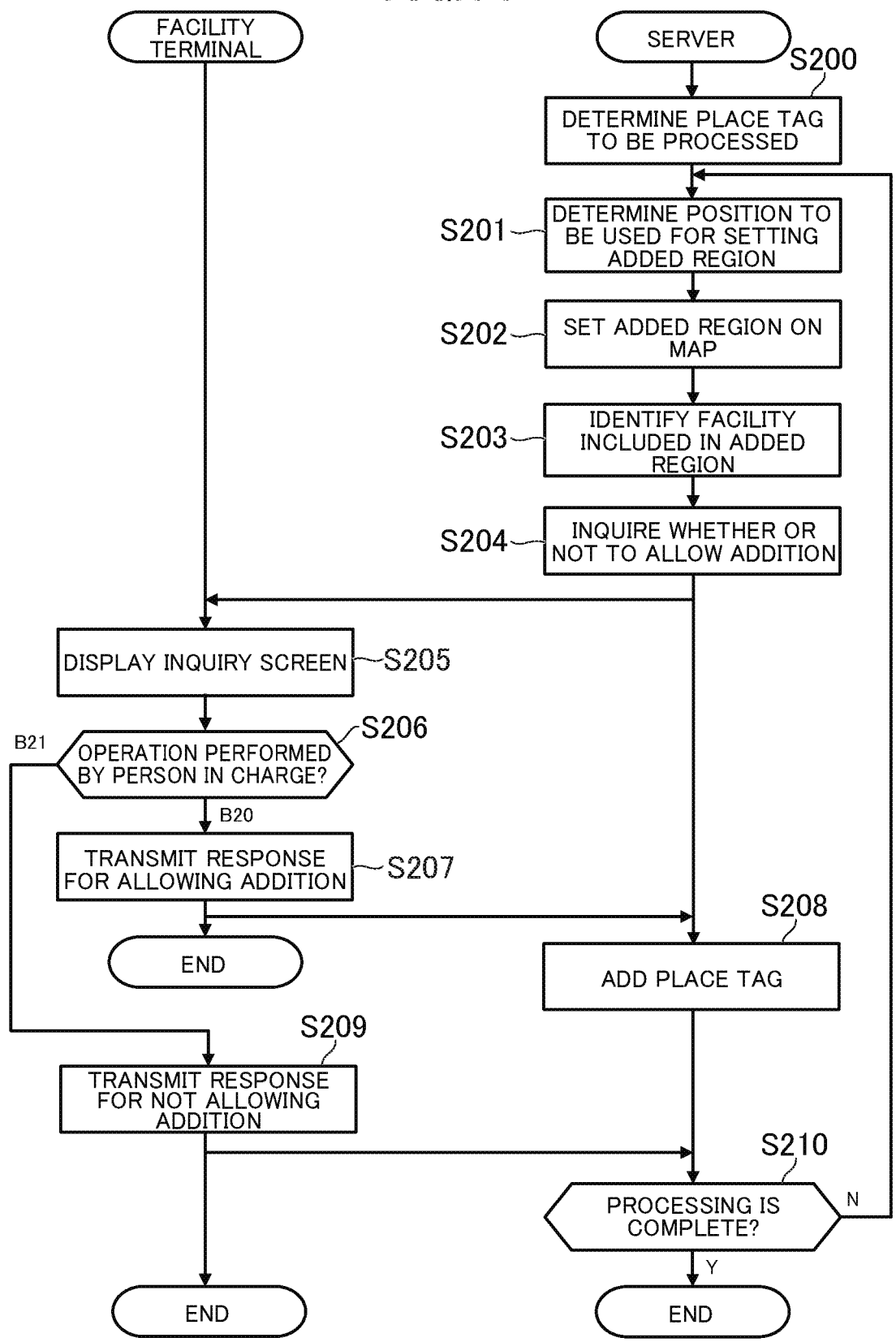
FIG. 14 is a flowchart for illustrating place tag adding processing.

FIG. 14 is a flowchart for illustrating the place tag adding processing. The processing illustrated in FIG. 14 is executed by the control units 11 and 21 operating in accordance with programs stored in the storage units 12 and 22, respectively. The processing described below is an example of processing to be executed by the functional blocks illustrated in FIG. 9. The place tag adding processing may be executed periodically, or may be executed in response to an instruction from a system administrator.

As illustrated in FIG. 14, first, the control unit 21 of the server 20 determines a place tag serving as a processing target in the facility database DB (Step S200). The processing target is a place tag for which processing described later is to be executed. That is, the processing target is a place tag for which the added region A1 is to be set and for which an inquiry is to be made to a facility to which a place tag is not added. The place tag serving as a processing target may be determined in order of latest records for which place tags are stored in the facility database DB, or may be determined at random.

The control unit 21 determines positions to be used for setting the added region A1 based on the positions of group of facilities to which the place tag determined in Step S200 is added (Step S201). In Step S201, the control unit 21 excludes, from the processing target, a facility whose distance to the closest facility is equal to or larger than a threshold value. As a result of the processing of Step S201, the facility FA7 of FIG. 3 is not used for setting the added region A1.

The control unit 21 sets the added region A1 on the map M based on the positions of the group of facilities to which the place tag determined in Step S200 is added (Step S202). In Step S202, the control unit 21 sets tringles until the positions of all the facilities of the group of facilities form a vertex of at least one triangle based on the respective positions thereof, and connects those triangles to set the added region A1.

The control unit 21 identifies, based on the facility database DB, a facility included in the added region A1 set in Step S202 from among other facilities to which the place tag is not added being processed (Step S203). In Step S203, the control unit 21 determines whether or not the position of another facility to which the place tag is not added being processed is included in the added region A1.

The control unit 21 inquires of the facility terminal 10 of another facility identified in Step S203 based on the facility database DB whether or not to allow the place tag to be added (Step S204). In Step S204, the control unit 21 may set the inquiry screen G2 to be displayed when another facility identified in Step S203 has accessed the server 20, or the control unit 21 may make an inquiry by using, for example, an email. When a plurality of facilities are identified in Step S203, inquiries are made to the respective plurality of facilities in Step S204.

When an inquiry is made to the facility terminal 10, the control unit 11 displays the inquiry screen G2 on the display unit 15 (Step S205). The control unit 11 identifies an operation performed by a person in charge of the facility based on a detection signal from the operating unit 14 (Step S206). In this case, any one of an operation of selecting the button B20 and an operation of selecting the button B21 is performed.

When the button B20 is selected (Step S206: B20), the control unit 11 transmits a response to the effect that the place tag is allowed to be added together with the facility ID (Step S207). In Step S207, the control unit 11 transmits a response to the effect that the button B20 is selected.

When the server 20 has received the facility ID and the response, the control unit 21 adds a facility indicated by the facility ID with the place tag (Step S208). In Step S208, the control unit 21 stores the place tag being processed into a record storing the received facility ID in the facility database DB. With this, the place tag can be used as an index.

On the contrary, when the button B21 is selected in Step S206 (Step S206: B21), the control unit 11 transmits, to the server 20, a response to the effect that the place tag is not allowed to be added (Step S209). In Step S209, the control unit 11 transmits a response to the effect that the button B21 is selected. When the server 20 has received a response, the processing of Step S208 is not executed, and the control unit 21 proceeds to processing of Step S210 without adding the facility with the place tag.

The control unit 21 determines whether or not the processing is complete for all the place tags based on the facility database DB (Step S210). When there is a place tag for which the processing is not complete yet (Step S210: N), the control unit 21 returns to the processing of Step S201, and executes processing for the next place tag. On the contrary, when the control unit 21 has determined that the processing is complete for all the place tags (Step S210: Y), the processing is finished.

[4-3. Facility Search Processing]

Figure 15:
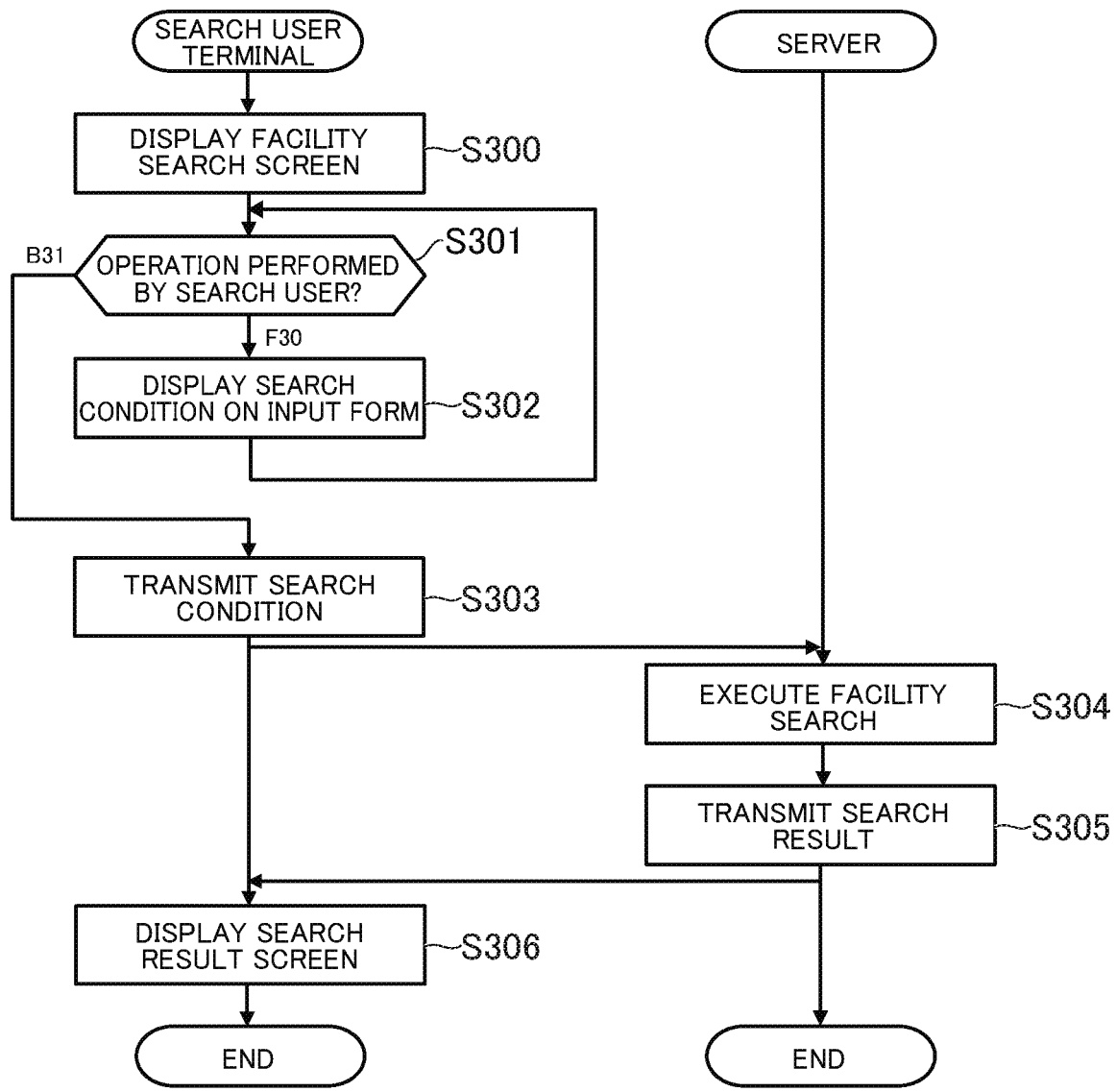
FIG. 15 is a flowchart for illustrating facility search processing.

FIG. 15 is a flowchart for illustrating facility search processing. The processing illustrated in FIG. 15 is executed by the control units 21 and 31 operating in accordance with programs stored in the storage units 22 and 32, respectively. The processing described below is an example of processing to be executed by the functional blocks illustrated in FIG. 9.

As illustrated in FIG. 15, first, the control unit 31 of the search user terminal 30 displays the facility search screen G3 on the display unit 35 (Step S300). In Step S300, the search user operates the operating unit 34, and when a URL is specified on the facility search screen G3 via a browser or a predetermined application is started, the facility search screen G3 is displayed on the display unit 35.

The control unit 31 identifies an operation performed by the search user based on a detection signal from the operating unit 34 (Step S301). In Step S301, an operation of inputting a search condition on the input form F30 or an operation of selecting the button B31 is executed.

When a search condition is input on the input form F30 (Step S301: F30), the control unit 31 displays the input search condition on the input form F30 (Step S302). In Step S302, the control unit 31 records the input search condition into the storage unit 32. When the search user has input a place tag as the search condition, a character string indicated by the place tag is recorded.

On the contrary, when the button B31 is selected (Step S301: B31), the control unit 31 transmits the search condition input on the input form F30 to the server 20 (Step S303). In Step S303, the control unit 31 transmits the search condition recorded in Step S302.

When the server 20 has received the search condition, the control unit 21 executes a facility search based on the facility database DB (Step S304). In Step S304, the control unit 21 executes a search with the received search condition and the facility information stored in the facility database DB serving as a query and an index, respectively. When the search user has input a place tag as the search condition, the control unit 21 executes a search with the place tag input by the search user and the place tag stored in the facility database DB serving as a query and an index, respectively.

The control unit 21 transmits a search result to the search user terminal 30 (Step S305). In Step S304, the control unit 21 transmits a data set such as the facility ID, facility name, and image of a facility retrieved in the search.

When the search user terminal 30 has received the search result, the control unit 31 displays the search result screen G4 on the display unit 35 (Step S306), and the processing is finished. After that, when the search user selects the display region A41 on the search result screen G4, the page of a facility selected by the search user is displayed, or reservation processing for the facility is executed. Publicly known processing can be applied to display of the page or the reservation processing itself, and thus a description thereof is omitted.

With the facility search system S according to this embodiment, when the added region A1, to which the same place tag is added, includes the positions of other facilities to which the place tag is not added, the place tag is added to the other facilities, and a facility search is executed with the place tag serving as an index even when the other facilities do not input the place tag. Therefore, it is possible to improve the accuracy of a search.

Further, the added region A1 is set based on the positions of the group of facilities whose distance to the closest facility is smaller than the threshold value within the group of facilities to which the same place tag is added, and the position of a facility away from the closest facility is not influenced by the added region A1. Thus, it is possible to prevent the place tag from being added to a facility having a low relevance due to a facility having a low reliability. Therefore, it is possible to effectively improve the accuracy of a facility search using a place tag.

Further, in a case where a group of facilities are away from each other, even when the same place tag having the same name is added to those facilities for different areas, it is possible to handle the place tags of those facilities separately by handling those place tags as different place tags. Therefore, it is possible to effectively improve the accuracy of a facility search using a place tag.

Further, it is possible to prevent an inappropriate place tag from being added to other facilities by inquiring of the other facilities to which the place tag is not added whether or not to allow the place tag to be added. Thus, it is possible to add each facility with a place tag also in consideration of a condition that cannot be determined only from the map or a straight distance. Therefore, it is possible to effectively improve the accuracy of a facility search using a place tag.

Further, the added region A1 is set based on a polygon connecting between the positions of the group of facilities to which the same place tag is added, that is, the added region A1 can be set with simpler processing. Thus, it is possible to alleviate the processing load on the server 20. Further, it is possible to speed up the processing of adding a place tag. Further, compared to a case of setting a circle at the center of a group of facilities to which a place tag is added and roughly setting the added region A1, it is possible to appropriately set the added region A1 by finely setting the shape of an outline of the added region A1.

5. Modification Examples

The present invention is not limited to the embodiment described above, and can be modified suitably without departing from the spirit of the present invention.

Figure 16:
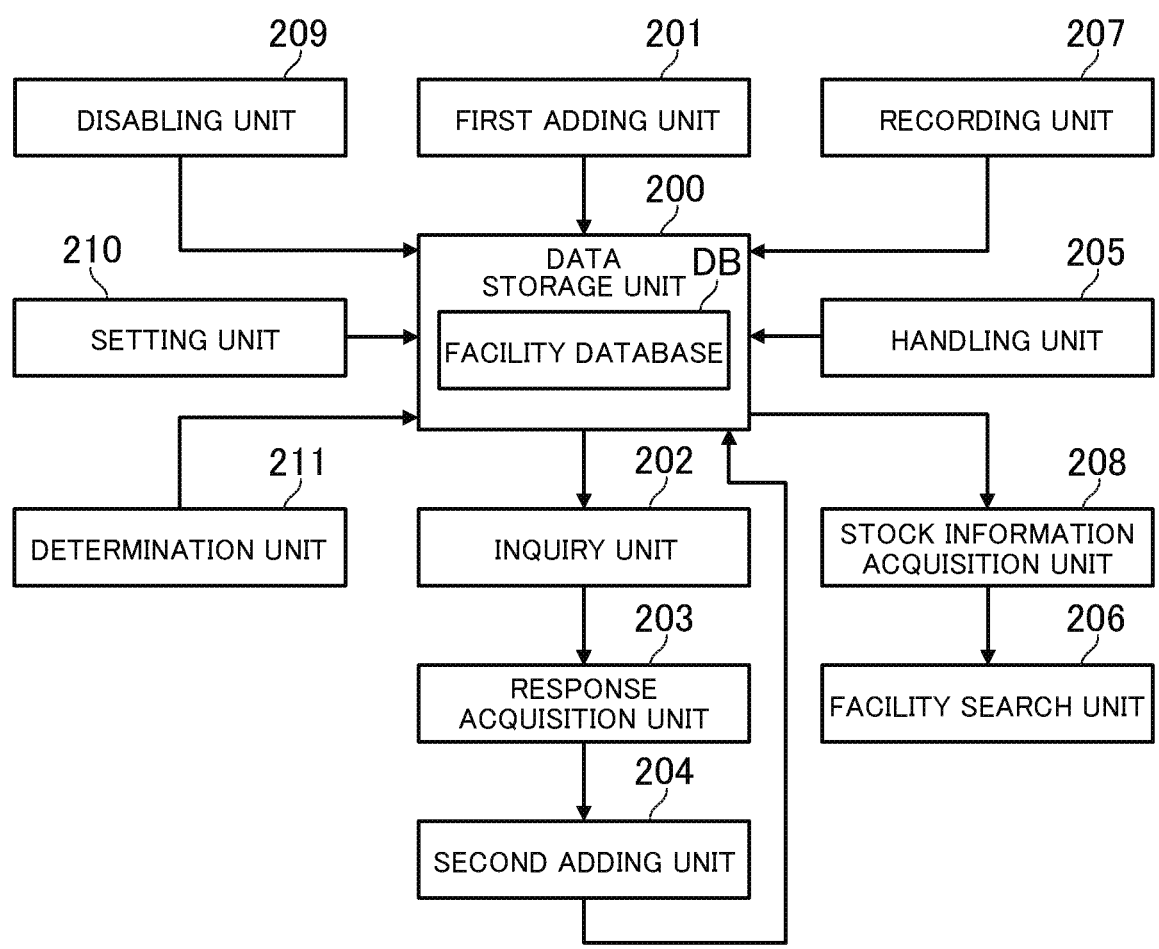
FIG. 16 is a functional block diagram in modification examples of the present invention.

FIG. 16 is a functional block diagram in modification examples of the present invention. As illustrated in FIG. 16, in the modification examples described below, in addition to the functions described in the embodiment, a recording unit 207, a stock information acquisition unit 208, a disabling unit 209, a setting unit 210, and a determination unit 211 are implemented. Similarly to the embodiment, in the modification examples described below, a description is given of a case in which primary functions are implemented by the server 20. However, as in the modification examples described below, at least two of the facility terminal 10, the server 20, and the search user terminal 30 may implement the functions in a distributed manner. The recording unit 207, the stock information acquisition unit 208, the disabling unit 209, the setting unit 210, and the determination unit 211 are examples of recording means, stock information acquisition means, disabling means, setting means, and determination means, respectively.

(1) For example, even in a case where a place tag specified by a search user as a search condition is added to a facility, when the place tag is not appropriate for the facility, the search user may not view a page of the facility or reserve the facility. A search score of such a facility may be decreased, or such a facility may not be included in the search result.

A facility search system S according to Modification Example (1) of the present invention includes the recording unit 207. The recording unit 207 is mainly implemented by the control unit 21. The recording unit 207 records action information on an action of the search user in response to the search result obtained by the facility search unit 206.

The action of the search user in response to the search result is an operation performed by the search user on the search result screen G4. For example, the action of the search user is to select a facility displayed on the search result screen G4, view a page of the facility, or use (reserve) the facility.

The action information indicates an action of the search user in response to the search result. For example, the action information indicates a selection status of the facility. The selection status is the number of times or frequency of selection on the search result. In other words, the selection status can also be referred to as "viewing status" (e.g., so-called click-through rate (CTR)) of a page of the facility, or "usage status" (e.g., so-called conversion (CV)) of the facility.

The action information is only required to indicate the action of at least one search user, and for example, the action information may indicate all the actions of a plurality of search users, or may indicate a part of actions of a plurality of search users. Further, the action information may indicate an action in a total period in the past, or may indicate an action in a recent predetermined period (e.g., about several days to several months).

The data storage unit 200 in Modification Example (1) stores the action information. Now, a description is given of a case in which the action information is stored into the facility database DB, but the action information may be stored into another database.

FIG. 17 is a table for showing an example of storage of data into the facility database DB in Modification Example (1). As shown in FIG. 17, the action information is stored for each place tag of a facility. When a plurality of place tags are added to a facility, the action information is stored in association with each of those plurality of place tags. That is, the action information is stored for each place tag. Each piece of action information indicates an action of the search user for the search result based on a place tag indicated by the action information.

In the example of storage of data in FIG. 17, the place tag of "XXX Resort" is added to "Restaurant A" and "Hotel C". The action information for the place tag is stored in those facilities, and indicates an action of the search user with "XXX Resort" serving as the search condition. For example, when a search user who has set "XXX Resort" as the search condition selects or reserves "Restaurant A" or "Hotel C", the action information is updated.

The facility search unit 206 in Modification Example (1) executes a facility search based further on the action information. That is, the facility search unit 206 executes a facility search based on the place tag added to each facility and the action information associated with the place tag. For example, the facility search unit 206 uses the action information associated with the place tag of each facility to put a limitation on a search for the facility.

The term "limitation" refers to excluding a facility from a search target, or decreasing a score although the facility is set as a search target. The phrase "excluding a facility from a search target" means avoiding referring to an index of a facility at the time of a search, or referring to an index but avoiding including a facility in the search result.

The phrase "score" refers to a probability of matching the search condition. As the score becomes higher, the probability also becomes higher, whereas as the score becomes lower, the probability also becomes lower. That is, as the score becomes higher, the probability of matching the search condition also becomes higher, whereas as the score becomes lower, the probability of matching the search condition also becomes lower. Various kinds of techniques can be applied to the method of calculating the score itself, and for example, the score may be calculated based on a degree of matching between character strings, or the score may be calculated based on a distance between word vectors calculated by, for example, Word2vec. The score influences the order of display on the search result screen G4. For example, facilities are displayed on the search result screen G4 based on the scores of the respective facilities. For example, facilities retrieved as the search results are displayed in descending order of those scores.

For example, the facility search unit 206 puts a limitation on a search based on a place tag when the selection status indicated by the action information is a predetermined status. For example, the facility search unit 206 puts a limitation on a search based on a place tag when the number of times of selection indicated by the action information is smaller than a predetermined number of times, or puts a limitation on a search based on a place tag when the frequency of selection indicated by the action information is smaller than a predetermined frequency.

Further, for example, the facility search unit 206 may determine the score based on the search condition input by the search user, the index of the facility, and the action information. For example, the facility search unit 206 temporarily determines the score based on the search condition input by the search user and the index of the facility, and determines a definitive score value of the temporarily determined score based on the selection status indicated by the action information. The facility search unit 206 may determine the score so that as the number of times or frequency of selection indicated by the action information becomes higher, the score also becomes higher, whereas as the number of times or frequency of selection indicated by the action information becomes lower, the score also becomes lower.

According to Modification Example (1), a facility search is executed also in consideration of an action of the search user in response to the search result obtained by using a place tag, and when a place tag is added to an inappropriate facility, a limitation is put on a search or the score is decreased, to thereby be able to include a facility to which an appropriate place tag is added in the search result. That is, it is possible to remove noise from the search result to effectively improve the accuracy of a facility search.

(2) Further, for example, in a case where the facility search system S enables reservation of a facility, even when a search user executes a search by specifying a place tag as the search condition, there may be a small amount of stock of a facility to which a same place tag is added. In this case, a region for searching for a facility may be gradually expanded until a predetermined number or more of facilities with stock are found.

A facility search system S according to Modification Example (2) of the present invention includes the stock information acquisition unit 208. The stock information acquisition unit 208 is mainly implemented by the control unit 21. The stock information acquisition unit 208 acquires stock information on the stock of each facility. Now, a description is given of a case in which the stock information is stored into the facility database DB, but the stock information may be stored into other databases.

FIG. 18 is a table for showing an example of storage of data into the facility database DB in Modification Example (2). As shown in FIG. 18, the facility database DB stores the stock information for each facility.

The term "stock" refers to the number of available reservations or available stocks of a facility. For example, when the facility is an accommodation facility, the stock is the number of available rooms. When the facility is a restaurant, the stock is the number of left tables or seats in the restaurant. When the facility is a shop, the stock information indicates the number of stocks of a product. When the facility is a rental car company, the stock information indicates the number of left cars. When the facility is a bus company, the stock is the number of left seats in a bus. When the facility is a station, the stock is the number of left seats in a train. When the facility is a travel agency, the stock indicates the number of left available reservations. The stock information is only required to indicate each of such numbers.

The facility search unit 206 in Modification Example (2) searches for a facility with stock based further on the stock information on each facility, and executes a facility search while expanding the search region based on a place tag until a predetermined number or more of facilities with stock are retrieved. The predetermined number may be a fixed number, or may be a variable depending on the place tag. When the predetermined number is set to a variable, the number may be increased as the number of facilities to which the place tag is added increases.

The term "search region" refers to a range to be searched. In other words, the search region is a region of a facility whose index is to be referred to at the time of a search. For example, the search region is set so as to include at least one facility among a group of facilities to which a place tag is added.

For example, similarly to the method described in the embodiment, the facility search unit 206 searches for a facility to which a place tag input by the search user is added. Then, the facility search unit 206 refers to the stock information on the facility to determine whether or not there is stock. For example, the facility search unit 206 determines whether or not the number of stocks of the facility retrieved in the search is equal to or larger than a threshold value. The facility search unit 206 determines that there is stock when the number of stocks is equal to or larger than the threshold value, or determines that there is no stock when the number of stocks is smaller than the threshold value. This threshold value may be set to 1, or a value equal to or larger than 2 may be set as the threshold value so that it may be determined that there is no stock when there is little stock.

For example, the facility search unit 206 finishes a search without particularly setting a search region when the number of facilities with stock is equal to or larger than the predetermined number among facilities retrieved in the search. On the contrary, when the number of facilities with stock is smaller than the predetermined number among facilities retrieved in the search, the facility search unit 206 sets the search region based on the place tag input by the search user.

Figure 19:
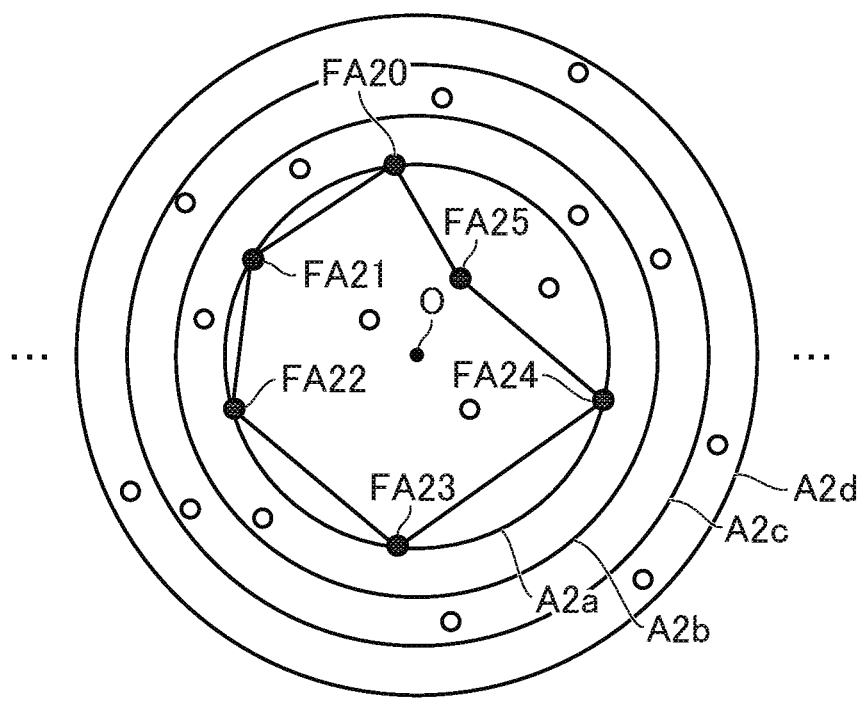
FIG. 19 is a diagram for illustrating a situation in which a search region is set in Modification Example (2).

FIG. 19 is a diagram for illustrating a situation in which the search region is set in Modification Example (2). As illustrated in FIG. 19, the facility search unit 206 sets a search region A2 based on the positions of a group of facilities to which a place tag is added. The facility search unit 206 may set the search region based on all the positions of the group of facilities, or may set the search region based on a part of positions of the group of searches.

For example, the facility search unit 206 calculates an average value of positions of the facilities FA20 to FA25, and sets a search region A2a with a predetermined radius centered at a position of the average value, which is set as a center O. The facility search unit 206 searches for a facility with stock while increasing the radius of the search region A2a.

The center O may be a simple average or weighted average of the positions of a group of facilities. When the weighted average is used, the positions of respective facilities may be weighted in accordance with the density of those facilities, or may be weighted in accordance with the number of times or frequency of selection of those facilities. Further, in FIG. 19, a description is given on the assumption that the search region is a circle, but the search region may have any shape. For example, the search region may be a polygon such as a triangle or a square.

For example, the facility search unit 206 sets a search region A2b by multiplying the radius of the search region A2a by a predetermined value (e.g., about 1.1 times to 2 times). Then, the facility search unit 206 searches for a facility positioned inside the search region A2b based on the search condition input by the search user. A place tag is not set in a facility outside the search region A2a in principle, and thus a search may be executed by excluding the place tag from the search condition. The facility search unit 206 refers to the stock information on facilities retrieved in the search to determine whether or not there is stock.

For example, the facility search unit 206 finishes a search without particularly expanding the search region when the number of facilities with stock is equal to or larger than the predetermined number among the facilities retrieved in the search. On the contrary, when the number of facilities with stock is smaller than the predetermined number among the facilities retrieved in the search, the facility search unit 206 increases the radius of the search region A2b and executes a search again. After that, the facility search unit 206 repeatedly expands the search region and executes a search, like the search regions A2c, A2d, . . . , until the number of facilities with stock becomes equal to or larger than the predetermined number.

According to Modification Example (2), it is possible to include a facility with stock in the search result by searching for a facility while expanding the search region based on a place tag until a predetermined number or more of facilities with stock are retrieved. For example, even when a place tag is not added to a facility inside the search region, this facility is close to a facility to which the place tag is added, and thus is likely to have a relationship with this area. It is possible to present a facility with stock to the search user by including such a facility in the search target.

(3) Further, for example, even in a case where a place tag specified by a search user as the search condition is added to a facility, when the place tag is not appropriate for the facility, the search user may not view a page of the facility or reserve the facility. The place tag may be set to be disabled for such a facility.

A facility search system S according to Modification Example (3) of the present invention includes the recording unit 207 and the disabling unit 209. The recording unit 207 is as described in Modification Example (1).

The disabling unit 209 is mainly implemented by the control unit 21. The disabling unit 209 disables the place tag added to each facility based on the action information.

The term "disable" refers to prohibiting execution of a search based on a place tag, and refers to avoiding referring to a place tag as an index or deleting a place tag from the index. For example, the disabling unit 209 changes a state of a place tag being associated with a facility to a state of the place tag not being associated with the facility. For example, the disabling unit 209 deletes a place tag stored in the facility database DB, or evacuates the place tag to another database.

Further, for example, a validity flag indicating validity of a place tag may be stored in the facility database DB. The validity flag takes any one of a first value indicating that the place tag is valid and a second value indicating that the place tag is invalid. The facility search unit 206 refers to, as an index, only the place tag whose validity flag takes the first value at the time of execution of a search. The disabling unit 209 may disable the place tag by changing the value of the validity flag from the first value to the second value.

For example, the disabling unit 209 disables the place tag when the selection status indicated by the action information is a predetermined status. For example, the facility search unit 206 may calculate the evaluation value of a place tag for each facility based on the action information, and disable the place tag when the evaluation value is smaller than a threshold value. For example, the facility search unit 206 disables the place tag when the number of times of selection indicated by the action information is smaller than a predetermined number, or disables the place tag when the frequency of selection indicated by the action information is smaller than a predetermined frequency.

With Modification Example (3), it is possible to include a facility to which an appropriate place tag is added in the search result by determining validity of a place tag of each facility based on the action of the search user in response to the search result using a place tag, and disabling a place tag when the place tag is added to an inappropriate facility. That is, it is possible to remove noise from the search result to effectively improve the accuracy of a facility search.

(4) Further, for example, when a response to the effect that a place tag is not allowed to be added is acquired from a facility, it may be actually inappropriate to add the place tag to the facility even when the facility is surrounded by facilities to which the place tag is added on the map. In such a case, the surroundings of the facility may be set as a prohibited region, in which the place tag is not to be added.

A facility search system S according to Modification Example (4) of the present invention includes the setting unit 210. The setting unit 210 is mainly implemented by the control unit 21. When a response to the effect that a place tag is not allowed to be added is acquired from other facilities, the setting unit 210 sets a prohibited region, in which the place tag is prohibited from being added, based on the positions of the other facilities.

The prohibited region is a partial region of the added region A1, and is a region in which the place tag is not added even when the added region A1 includes a facility. Now, a description is given on the assumption that the prohibited region is a circle, but the prohibited region may have any shape. For example, the prohibited region may be a polygon such as a triangle or a square.

Figure 20:
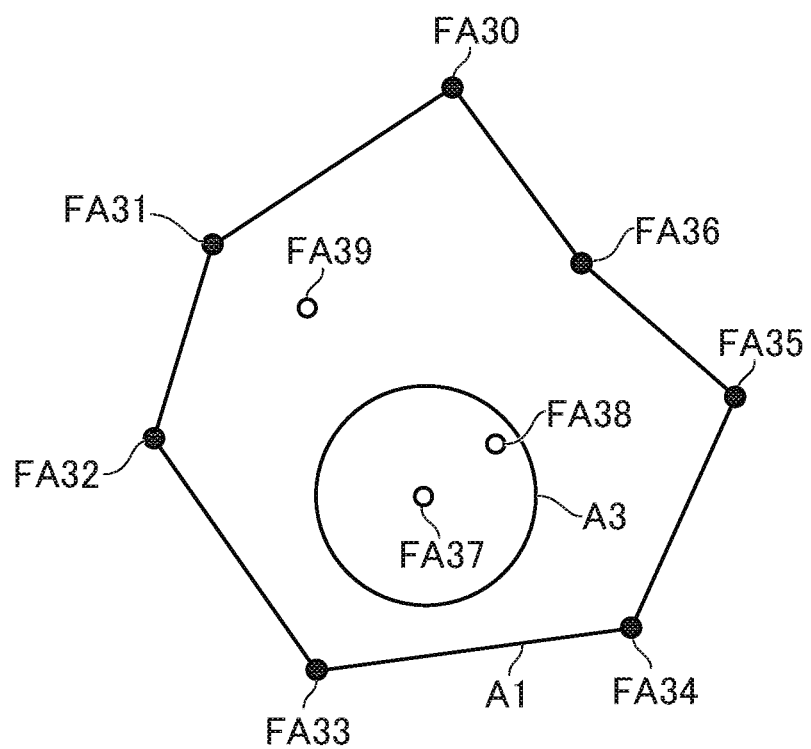
FIG. 20 is an explanatory diagram for illustrating a prohibited region.

FIG. 20 is an explanatory diagram for illustrating a prohibited region. In the example illustrated in FIG. 20, a place tag is added to each of the facilities FA30 to FA36, and it is assumed that the facility FA37 is inquired whether or not to allow the place tag to be added. Then, it is assumed that the facility FA37 has transmitted a response to the effect that the place tag is not allowed to be added. As illustrated in FIG. 20, the setting unit 210 sets a prohibited region A3 so that the prohibited region A3 includes the facility FA37, which has transmitted a response to the effect that the place tag is not allowed to be added. For example, the setting unit 210 sets the prohibited region A3 with a predetermined radius centered at the position of the facility FA37.

The second adding unit 204 in Modification Example (4) adds the place tag to other facilities based on the prohibited region A3. The second adding unit 204 adds the place tag to other facilities that are located inside the added region A1 and outside the prohibited region A3. In the example of FIG. 20, the facility FA38 out of the facilities FA38 and FA39 is located inside the prohibited region A3, and thus the place tag is not added without making an inquiry of whether or not to allow the place tag to be added. Meanwhile, the facility FA39 is located inside the added region A1 and outside the prohibited region A3, and thus the facility FA39 is inquired of whether or not to allow the place tag to be added, and then the place tag is added to the facility FA39.

With Modification Example (4), the prohibited region A3 is set when a response to the effect that a place tag is not allowed to be added is acquired, to thereby be able to set a more appropriate added region A1. For example, when the place tag of "YYY fireworks display" is added, the prohibited region A3 is set to an area near a facility that is close to the fireworks display site but hinders seeing of fireworks actually. Thus, it is possible to prevent an inappropriate place tag from being added to a facility to increase the reliability of the place tag. Further, it is possible to prevent an unrequired inquiry from being transmitted to a facility. Therefore, it is possible to alleviate a processing load on the server 20 and a communication load on the network N.

(5) Further, for example, an area indicated by a place tag may overlap with another larger area or another smaller area. When the area overlapped by the plurality of areas is small, the plurality of areas are predicted to have a low relevance, whereas when the area overlapped by the plurality of areas is large, the plurality of areas are predicted to have a high relevance. Thus, when the area overlapped by the plurality of areas is large, the place tags of respective areas may have an upper-lower relationship, and the place tags may have a hierarchical structure.

A facility search system S according to Modification Example (5) of the present invention includes the determination unit 211. The determination unit 211 is mainly implemented by the control unit 21. When a plurality of regions determined based on a plurality of place tags overlap with each other, the determination unit 211 determines an upper-lower relationship between the plurality of place tags based on the manner of overlapping of the plurality of regions.

The "region determined based on a place tag" is a region determined based on the positions of the group of facilities to which the place tag is added, and a description is given of a case in which the region is the same as the added region A1. However, the region may be a region different from the added region A1. When the region is a region different from the added region A1, the region is only required to be a region including the position of at least one facility included in the group of facilities. For example, the region may be a circle centered at the center or center of gravity of the group of facilities, or may be a polygon including the center or center of gravity.

The phrase "manner of overlapping" refers to a size of an overlapping portion of the plurality of regions. The size may be an area of the overlapping portion, or may be a width of the overlapping portion. The term "upper-lower relationship" refers to a relationship between an upper position and a lower position, and can also be referred to as a parent-child relationship or a hierarchical relationship. Place tags having an upper-lower relationship indicate the same region, but the sizes of regions are different from each other.

For example, the region indicated by an upper place tag is larger than the region indicated by a lower place tag. The region indicated by an upper place tag may include the entire region indicated by a lower place tag, or may include a part of the region. It is assumed that the region indicated by an upper place tag includes a predetermined proportion (e.g., 50% to 80%) or more of the region indicated by a lower place tag.

The positions of the region indicated by an upper place tag and the region indicated by a lower place tag may be completely the same as each other, but may deviate from each other a little. However, when the positions greatly deviate from each other, the relevance becomes lower, and thus the distance between the positions may be set to be smaller than a predetermined distance (e.g., several tens of meters to several kilometers).

For example, when the size of an overlapping portion of the added region A1 based on each of a plurality of place tags is equal to or larger than a threshold value, the determination unit 211 may set an upper-lower relationship in the plurality of place tags, whereas when the size is smaller than the threshold value, the determination unit 211 does not set an upper-lower relationship in the plurality of place tags.

Figure 21:
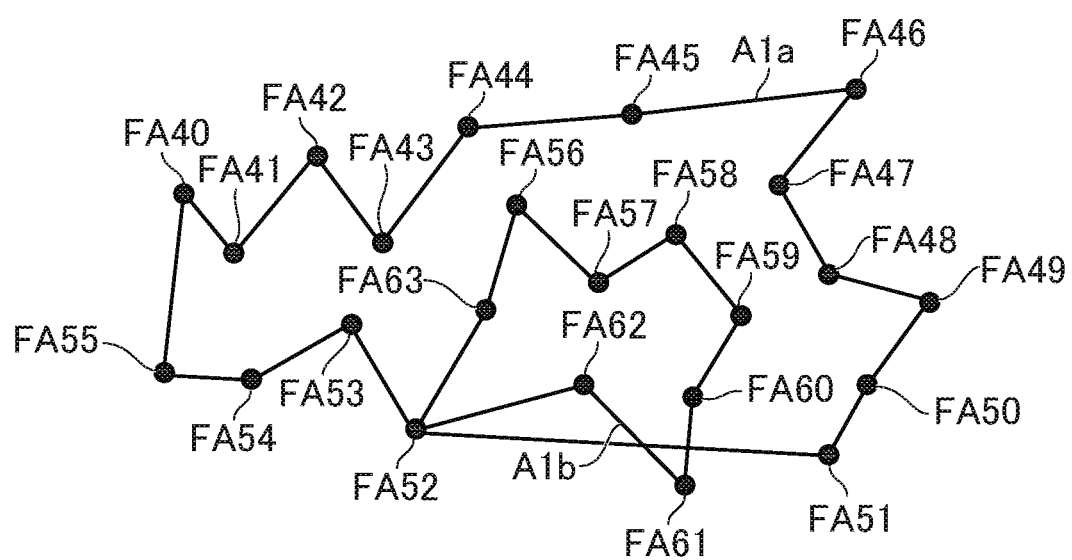
FIG. 21 is a diagram for illustrating an example of place tags having an upper-lower relationship.

FIG. 21 is a diagram for illustrating an example of place tags having an upper-lower relationship. In the example of FIG. 21, a first place tag of "XYZ City" is added to facilities FA40 to FA55, and a second place tag of "ZZZ Outlet Mall" is added to facilities FA52 and FA56 to FA63. As illustrated in FIG. 21, an added region A1*a* based on the first place tag of "XYZ City" and an added region A1*b* based on the second place tag of "ZZZ Outlet Mall" overlap with each other.

For example, the determination unit 211 determines whether or not the size of an overlapping portion of the added region A1*a* and the added region A1*b* is equal to or larger than a threshold value. The threshold value may be a fixed value, or a variable that depends on the number of facilities to which a place tag is added, for example. Further, the threshold value may have an absolute size, or may have a relative size that depends on the size of an added region. The relative size is a proportion of the overlapping portion to the size of an added region, for example. The "size" may mean the area of an added region, or may mean the width or length of a periphery of an added region.

Now, a description is given of an exemplary case in which the determination unit 211 determines whether or not the above-mentioned overlapping portion occupies a predetermined proportion or more of at least one of the added regions A1a and A1b. In the example of FIG. 21, the overlapping portion occupies a predetermined proportion or more of the added region A1b, and thus the determination unit 211 determines that the first place tag of "XYZ City" and the second place tag of "ZZZ Outlet Mall" have an upper-lower relationship.

The method of determining the upper-lower relationship may be any method, and for example, a place tag with a larger size may be set to have an upper position, and a place tag with a smaller size may be set to have a lower position. Further, for example, a place tag added to a larger number of facilities may be set to have an upper position, and a place tag added to a smaller number of facilities may be set to have a lower position. Further, for example, a place tag with a larger number of times or frequency of selection by the search user may be set to have an upper position, and a place tag with a smaller number of times or frequency of selection by the search user may be set to have a lower position.

Now, a description is given of an exemplary case in which the determination unit 211 sets the first place tag of "XYZ City" with a larger size of the added region to have an upper position, and sets the second place tag of "ZZZ Outlet Mall with a smaller size of the added region to have a lower position. For example, the determination unit 211 calculates the size of the added region A1a and the size of the added region A1b, and compares those sizes with each other to determine the upper-lower relationship.

The method of determining whether or not place tags have an upper-lower relationship is not limited to the above-mentioned examples. For example the determination unit 211 may determine whether or not place tags have an upper-lower relationship based on the numbers of the groups of facilities to which those place tags are added. For example, regarding groups of facilities to which place tags are added, when the proportion of a facility included in the overlapping portion is equal to or larger than a predetermined proportion, the determination unit 211 may determine that the place tags have an upper-lower relationship, whereas when the proportion of a facility included in the overlapping portion is smaller than the predetermined proportion, the determination unit 211 may determine that the place tags does not have an upper-lower relationship.

Further, a place tag at a lower position can have at least one upper place tag, and may have only one upper place tag or a plurality of upper place tags. Similarly, a place tag at an upper position can have at least one lower place tag, and may have only one lower place tag or a plurality of lower place tags.

The facility search unit 206 executes a facility search based further on the upper-lower relationship determined by the determination unit 211. For example, the facility search unit 206 may display place tags having an upper-lower relationship in a selectable manner on the facility search screen G3. In this case, place tags may be displayed as a tree. The place tags displayed on the facility search screen G3 may be selected by the search user one by one to narrow down the area.

Further, for example, when the number of facilities satisfying the search condition is equal to or larger than a predetermined number, the facility search unit 206 may narrow down facilities based on lower place tags. In contrast, when the number of facilities satisfying the search condition is smaller than the predetermined number, the facility search unit 206 may increase the number of facilities to be included in the search result by easing the search condition based on upper place tags.

With Modification Example (5), it is possible to effectively improve the accuracy of a facility search by setting place tags to have an upper-lower relationship. Further, it is possible to simplify management of place tags by setting place tags associated with each other to have an upper-lower relationship.

(6) Further, for example, the above-mentioned modification examples may be combined.

Further, for example, the method of setting the added region A1 is not limited to the methods described in the embodiment and the modification examples. For example, as described with reference to FIG. 11 in the embodiment, when a triangle connecting between positions of facilities to which a place tag is added are used to set the added region, any triangulation method can be applied, and a method other than that of FIG. 11 may be used. For example, a Delaunay triangulation algorithm may be used. Alternatively, for example, three patterns described below (hereinafter referred to as "patterns 1 to 3") may be used to set the added region A1.

Figure 22:
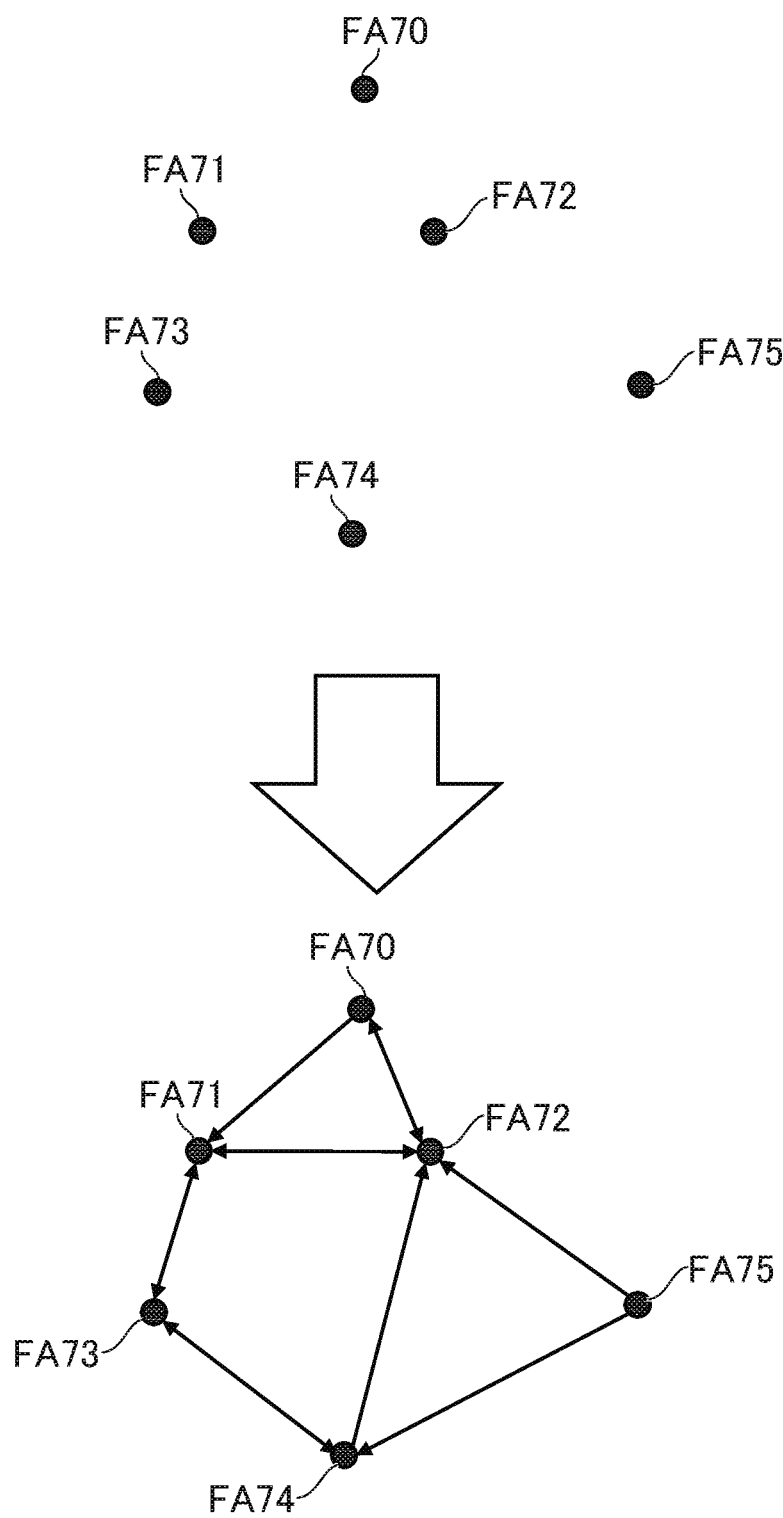
FIG. 22 is a diagram for illustrating a situation in which the added region is set in accordance with a pattern 1.

FIG. 22 and FIG. 23 are diagrams for illustrating a situation in which the added region A1 is set in accordance with a pattern 1. In the pattern 1, the second adding unit 204 may identify, for each facility to which a place tag is added, another facility closest to the facility and still another facility second closest to the facility, and connects between those facilities by lines. Then, the second adding unit 204 may identify outside lines among those lines, and set a region surrounded by the identified lines as the added region A1. In this case, the outer edge (outer periphery) of the added region A1 is identified.

In the example of FIG. 22, the second adding unit 204 identifies a facility FA71 closest to the facility FA70 and a facility FA72 second closest to the facility FA70, and sets a line connecting between the facilities FA70 and FA71, and a line connecting between the facilities FA70 and FA72. Then, the second adding unit 204 identifies a facility FA73 closest to the facility FA71 and the facility FA72 second closest to the facility FA71, and sets a line connecting between the facilities FA71 and FA73, and a line connecting between the facilities FA71 and FA72.

After that, similarly, the second adding unit 204 sets a line connecting between the facilities FA73 and FA71, a line connecting between the facilities FA73 and FA74, a line connecting between the facilities FA74 and FA73, a line connecting between the facilities FA74 and FA72, and a line connecting between the facilities FA75 and FA74. The added region A1 is a region (region surrounded by lines connected in order of facilities FA70, FA71, FA73, FA74, FA75, FA72, and FA70) surrounded by outside lines among those lines.

In the example of FIG. 23, the second adding unit 204 identifies a facility FA81 closest to the facility FA80 and a facility FA82 second closest to the facility FA80, and sets a line connecting between the facilities FA80 and FA81, and a line connecting between the facilities FA80 and FA82. Then, the second adding unit 204 identifies a facility FA83 closest to the facility FA81 and the facility FA80 second closest to the facility FA81, and sets a line connecting between the facilities FA81 and FA83, and a line connecting between the facilities FA81 and FA80.

After that, similarly, the second adding unit 204 sets a line connecting between the facilities FA82 and FA81, a line connecting between the facilities FA82 and FA84, a line connecting between the facilities FA83 and FA81, a line connecting between the facilities FA83 and FA82, a line connecting between the facilities FA84 and FA82, a line connecting between the facilities FA84 and FA85, a line connecting between the facilities FA85 and FA84, and a line connecting between the facilities FA85 and FA82 The added region A1 is a region (region surrounded by lines connected in order of facilities FA80, FA81, FA83, FA82, FA84, FA85, FA82, and FA80) surrounded by outside lines among those lines. That is, the added region A1 may include a plurality of regions.

Figure 24:
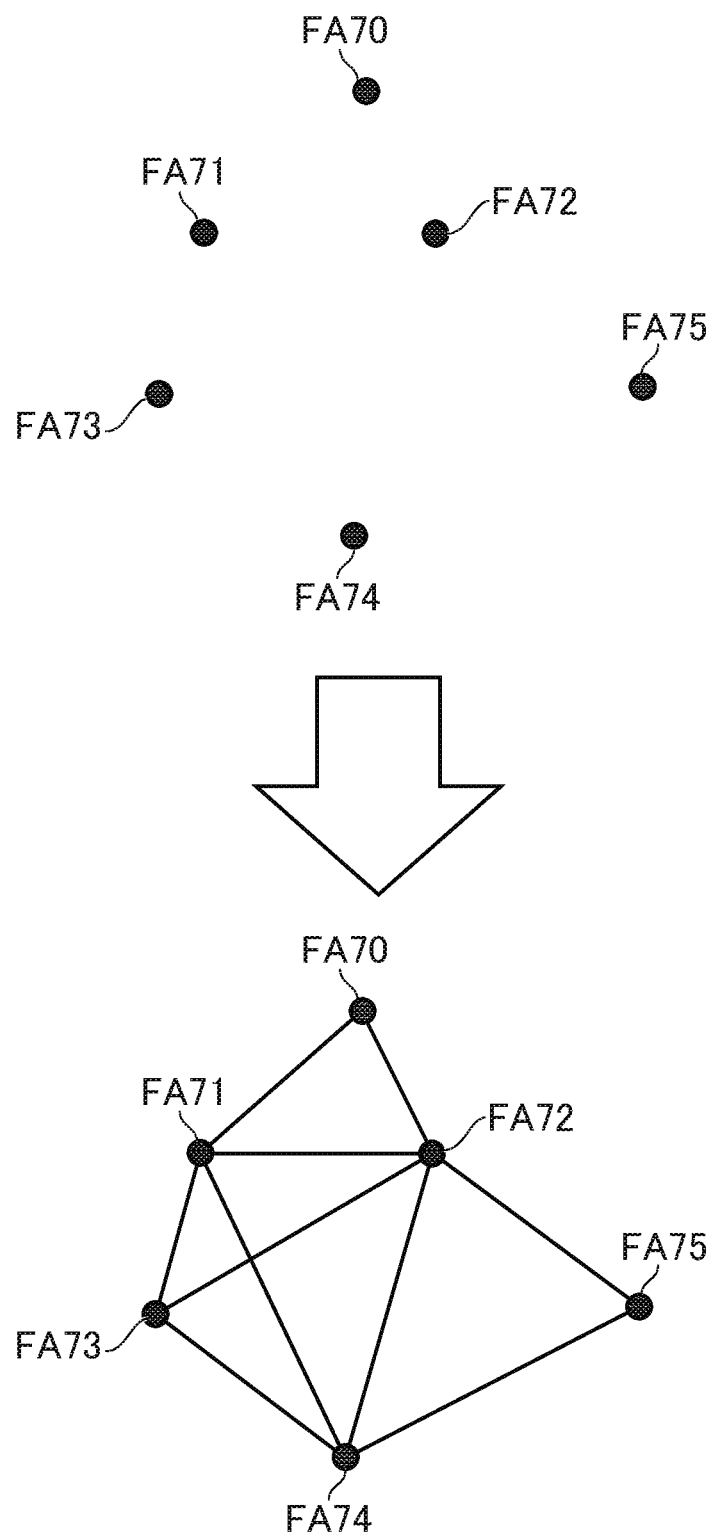
FIG. 24 is a diagram for illustrating a situation in which the added region is set in accordance with a pattern 2.

FIG. 24 and FIG. 25 are diagrams for illustrating a situation in which the added region A1 is set in accordance with a pattern 2. The arrangement of facilities in FIG. 24 is the same as that of FIG. 22, and the arrangement of facilities in FIG. 25 is the same as that of FIG. 23. In the pattern 2, the second adding unit 204 may identify, for each facility to which a place tag is added, another facility closest to the facility and still another facility second closest to the facility, and sets a triangle by connecting between those three facilities. Then, the second adding unit 204 may set, as the added region A1, a region obtained by connecting or overlapping the triangles of those facilities. In the pattern 2, some facilities do not always form a vertex of the added region A1.

In the example of FIG. 24, the second adding unit 204 sets a triangle connecting between the facility FA70, the facility FA71 closest to the facility FA70, and the facility FA72 second closest to the facility FA70. The second adding unit 204 sets a triangle connecting between the facility FA71, the facility FA73 closest to the facility FA71, and the facility FA72 second closest to the facility FA71.

After that, similarly, the second adding unit 204 sets a triangle connecting between the facilities FA72, FA71, and FA70, a triangle connecting between the facilities FA73, FA71, and FA74, a triangle connecting between the facilities FA74, FA73, and FA72, and a triangle connecting between the facilities FA75, FA72, and FA74. The added region A1 is a region obtained by connecting or overlapping those triangles, and the added region A1 of FIG. 24 is the same as that of FIG. 22.

Meanwhile, in the example of FIG. 25, the second adding unit 204 sets a triangle connecting between the facility FA80, the facility FA81 closest to the facility FA80, and the facility FA82 second closest to the facility FA80. The second adding unit 204 sets a triangle connecting between the facility FA81, the facility FA80 closest to the facility FA81, and the facility FA83 second closest to the facility FA81.

After that, similarly, the second adding unit 204 sets a triangle connecting between the facilities FA82, FA81, and FA84, a triangle connecting between the facilities FA83, FA81, and FA82, a triangle connecting between the facilities FA84, FA85, and FA82, and a triangle connecting between the facilities FA85, FA84, and FA82. The added region A1 is a region obtained by connecting or overlapping those triangles, and the added region A1 of FIG. 25 is a region (region surrounded by lines connected in order of facilities FA80, FA81, FA83, intersection P, FA84, FA85, and FA82) different from that of FIG. 23. That is, the added region A1 of FIG. 25 is a region larger than the added region A1 of FIG. 23 by a triangle connecting between the intersection P and facilities FA82 and FA84.

Figure 26:
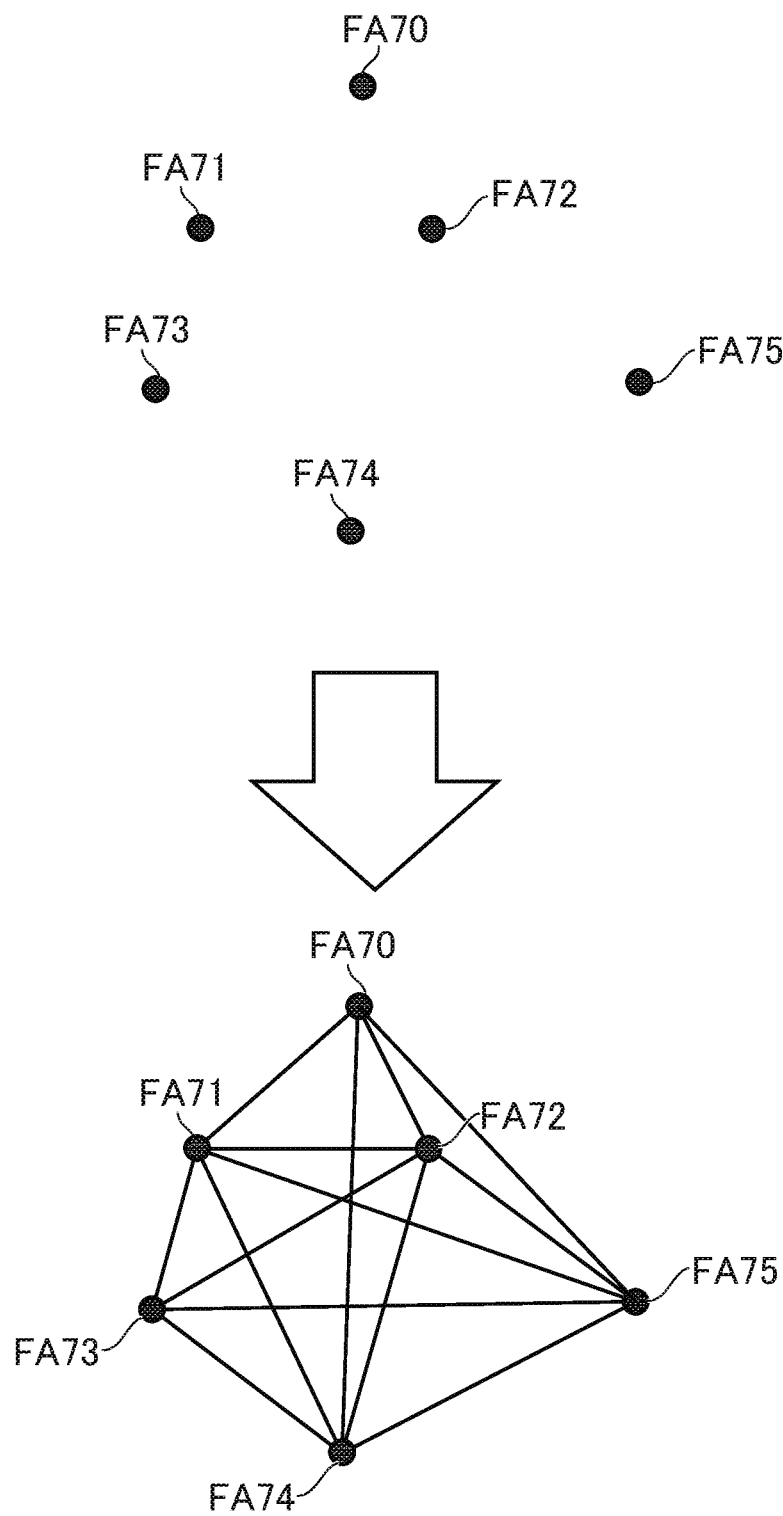
FIG. 26 is a diagram for illustrating a situation in which the added region is set in accordance with a pattern 3.

FIG. 26 is a diagram for illustrating a situation in which the added region A1 is set in accordance with a pattern 3. As illustrated in FIG. 26, for example, the second adding unit 204 may set the added region A1 by connecting between facilities to which a place tag is added. For example, the second adding unit 204 may connect between all the facilities, or may connect between facilities within a predetermined distance from each other. In the pattern 3, the outer edge (outer periphery) of the added region A1 is identified.

In the example of FIG. 26, the arrangement of facilities is the same as those of FIG. 22 and FIG. 24, but the added region A1 is a region (region surrounded by lines connected in order of facilities FA70, FA71, FA73, FA74, FA75, and FA70) different from those of FIG. 22 and FIG. 24. That is, the added region A1 of FIG. 26 is a region larger than the added regions A1 of FIG. 22 and FIG. 24 by a triangle connecting between the facilities FA70, FA72, and FA75.

Further, for example, the added region A1 may be reset periodically. For example, the above-mentioned processing may be executed again when a predetermined timing has arrived (e.g., every one week), and the added region A1 may be reset.

Further, for example, in a case where a facility to which a place tag is newly added is located outside of the added region A1 and within a predetermined distance from the closest facility, when a time period in which the processing load on the server 20 is low has arrived after the place tag is newly added to the facility, the above-mentioned processing may be executed again and the added region A1 may be reset. The processing load is only required to be information on the load of a computer, and is, for example, a CPU usage, a memory usage, or an amount of communication per unit time. Various publicly known techniques can be applied as the acquisition method itself, and for example, a predetermined command (e.g., top command) may be used to acquire the CPU usage or the memory usage, or an amount of data received per unit time may be measured to acquire the amount of communication. The second adding unit 204 determines whether or not the processing load on the server 20 is equal to or larger than a threshold value, and does not execute processing of resetting the added region A1 when the processing load is equal to or larger than the threshold value, and executes the processing of resetting the added region A1 when the processing load is smaller than the threshold value. In this manner, it is possible to alleviate the processing load on the server 20.

Further, for example, the second adding unit 204 may reset the added region A1 by recreating the entire added region A1 or adding a region to the existing added region A1. For example, when the added region A1 is set by using a triangle as in FIG. 24 or FIG. 25, the second adding unit 204 may identify a triangle by setting a facility to which a place tag is newly added as a vertex and selecting two close facilities so as not to intersect a side of an existing triangle, and add the identified triangle to the added region A1. In this manner, compared to a case of recreating the entire added region A1, it is possible to reset the added region A1 with simpler processing. Thus, it is possible to alleviate the processing load on the server 20 while speeding up the processing of setting the added region A1.

Figure 27:
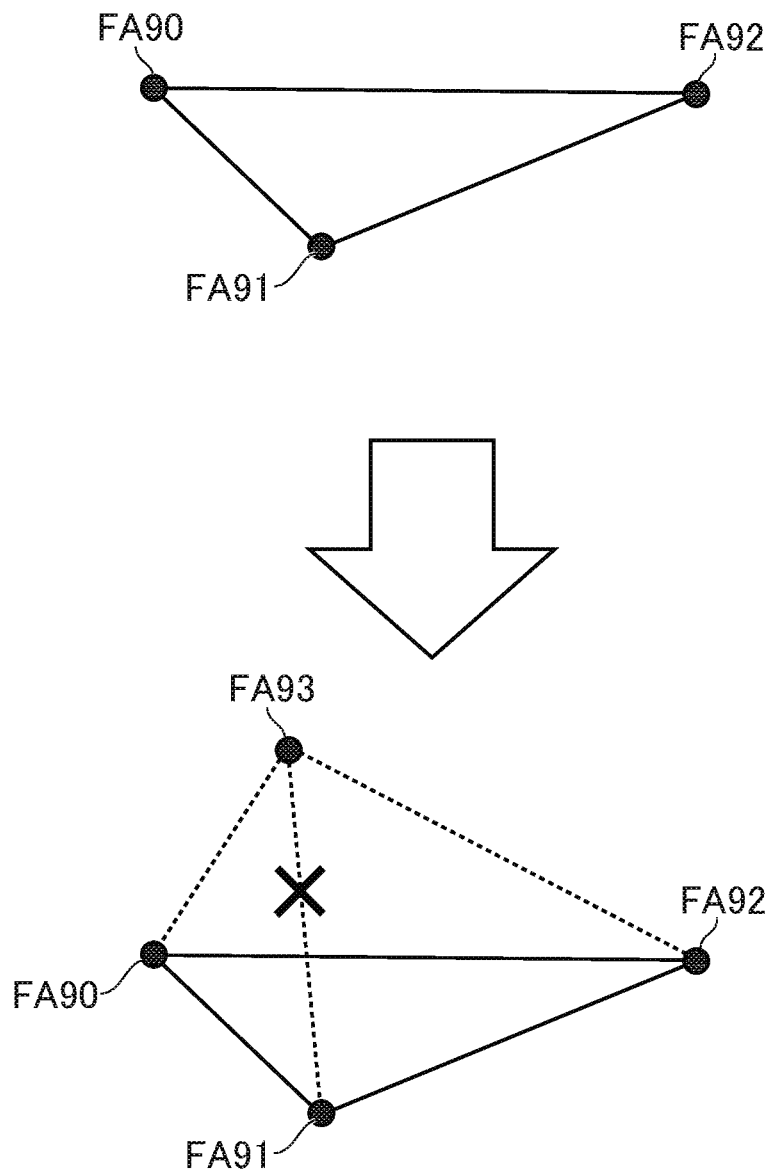
FIG. 27 is a diagram for illustrating a situation in which a new region is added to the added region.

FIG. 27 is a diagram for illustrating a situation in which a new region is added to the added region A1. In the example of FIG. 27, it is assumed that the added region A1 is set by facilities FA90, FA91, and FA92, to which the place tag is added. In this case, when a facility FA93 to which a place tag is added is newly added, facilities close to the facility FA93 are the facilities FA90 and FA91. However, a triangle connecting between the facilities FA93, FA90, and FA91 intersects with an existing triangle, and thus the second adding unit 204 may exclude the facility FA91 from setting of a triangle, and add a triangle connecting between the facilities FA93, FA90, and FA92 to the existing added region A1 to set the new added region A1.

Further, for example, the facility terminal 10, the server 20, and the search user terminal 30 may implement the functions in a distributed manner. Further, for example, the first adding unit 201 may be implemented by the facility terminal 10. In this case, the first adding unit 201 is mainly implemented by the control unit 11. The first adding unit 201 of the facility terminal 10 may transmit a data set including a facility ID and a place tag to the server 20, and the server 20 may store the received data set into the facility database DB. Further, for example, the first adding unit 201 may be implemented by the search user terminal 30. In this case, the first adding unit 201 is mainly implemented by the control unit 31. The first adding unit 201 of the search user terminal 30 may acquire a place tag input by the search user based on a detection signal from the operating unit 34 and transmit the data set including a facility ID and a place tag to the server 20, and the server 20 may store the received data set into the facility database DB.

Further, for example, the inquiry unit 202 and the response acquisition unit 203 may be implemented by the facility terminal 10. In this case, the inquiry unit 202 and the response acquisition unit 203 are mainly implemented by the control unit 11. For example, the inquiry unit 202 may cause the inquiry screen G2 to be displayed on the display unit 15, and the response acquisition unit 203 may acquire a response based on a detection signal from the operating unit 14, and transmit the response to the server 20.

Further, for example, the second adding unit 204 may be implemented by the facility terminal 10. In this case, the second adding unit 204 is mainly implemented by the control unit 11. The second adding unit 201 of the facility terminal 10 may transmit a data set including a facility ID and a place tag to the server 20, and the server 20 may store the received data set into the facility database DB. Further, for example, the second adding unit 204 may be implemented by the search user terminal 30. In this case, the second adding unit 204 is mainly implemented by the control unit 31. The second adding unit 204 of the search user terminal 30 may acquire a place tag input by the search user based on a detection signal from the operating unit 34, transmit the data set including a facility ID and a place tag to the server 20, and the server 20 may store the received data set into the facility database DB.

Further, for example, data described as being stored into the data storage unit 200 may be stored into a database server different from the server 20, or may be stored into a database server outside the facility search system S.

The invention claimed is:

1. A facility search system comprising:
at least one processor configured to:
receive, by a user operation via an information input user interface related to a first facility, an input of first area information indicating an area in which the first facility is located, and add the first area information to information of the first facility;
identify a group of facilities to which the same area information as the first facility has been added, and set a region based on positions of the identified group of facilities;
identify a second facility to which the first area information of the first facility has not been added, the second facility being located within the set region;
add the first area information of the identified group of facilities to information of the second facility; and
receive the first area information as a query for searching, and execute a facility search based on a matching between the first area information and area information added to information of each facility.

2. The facility search system according to claim 1, wherein the at least one processor is configured to set the region based on positions of a group of facilities that have a distance to a closest facility smaller than a threshold value among the group of facilities to which the same area information is added.

3. The facility search system according to claim 1, wherein the at least one processor is configured to, based on a first group of facilities and a second group of facilities, to which the same area information is added, having a distance equal to or larger than a threshold value, handle the area information added to the first group of facilities and the area information added to the second group of facilities as separate pieces of area information.

4. The facility search system according to claim 1, wherein the at least one processor is configured to:
inquire of the second facility whether adding the area information is allowed or not;
acquire a response from the second facility; and
add the area information to the second facility based on the response.

5. The facility search system according to claim 1, wherein the at least one processor is configured to set the region based on a polygon connecting between respective positions of the group of facilities to which the same area information is added.

6. The facility search system according to claim 1, wherein the at least one processor is configured to record, in action information, an action of a search user in response to a search result, and
execute the facility search based further on the action information.

7. The facility search system according to claim 1, wherein the at least one processor is configured to:
acquire stock information on stock of each facility;
search for a facility with stock based further on the stock information on each facility; and
execute the facility search while expanding a search region that is based on the area information until a predetermined number or more of facilities with stock are retrieved.

8. The facility search system according to claim 1, wherein the at least one processor is configured to:
record, in action information, an action of a search user in response to a search result; and
disable the area information added to each facility based on the action information.

9. The facility search system according to claim 4, wherein the at least one processor is configured to:
set a prohibited region for prohibiting the area information to be added based on a position of the second facility based on the acquired response from the second facility indicating that the area information is not allowed to be added; and
add the first area information to a third facility, which is located within the set region and to which area information has not been added, further based on whether the third facility is included in the prohibited region.

10. The facility search system according to claim 1, wherein the at least one processor is configured to:
- determine, when a plurality of regions determined based on a plurality of pieces of area information overlap with each other, an upper-lower relationship between the plurality of pieces of area information based on a manner of overlapping of the plurality of regions; and
- execute the facility search based further on the upper-lower relationship.

11. A facility search method, comprising:
- receiving, by a user operation via an information input user interface related to a first facility, an input of first area information indicating an area in which the first facility is located, and add the first area information to information of the first facility;
- identifying a group of facilities to which the same area information as the first facility has been added, and set a region based on positions of the identified group of facilities;
- identifying a second facility to which the first area information of the first facility has not been added, the second facility being located within the set region;
- adding the first area information of the identified group of facilities to information of the second facility; and
- receiving the first area information as a query for searching, and executing a facility search based on a matching between the first area information and area information added to information of each facility.

12. A non-transitory computer-readable information storage medium for storing a program for causing a computer to:
- receive, by a user operation via an information input user interface related to a first facility, an input of first area information indicating an area in which the first facility is located, and add the first area information to information of the first facility;
- identify a group of facilities to which the same area information as the first facility has been added, and set a region based on positions of the identified group of facilities;
- identify a second facility to which the first area information of the first facility has not been added, the second facility being located within the set region;
- add the first area information of the identified group of facilities to information of the second facility; and
- receive the first area information as a query for searching, and execute a facility search based on a matching between the first area information and area information added to information of each facility.

* * * * *